US011698558B2

(12) United States Patent
Kabe et al.

(10) Patent No.: US 11,698,558 B2
(45) Date of Patent: Jul. 11, 2023

(54) DISPLAY DEVICE WITH MULTI-DOMAIN METHOD

(71) Applicant: Japan Display Inc., Tokyo (JP)

(72) Inventors: Masaaki Kabe, Tokyo (JP); Jin Hirosawa, Tokyo (JP); Hayato Kurasawa, Tokyo (JP)

(73) Assignee: Japan Display Inc., Tokyo (JP)

(*) Notice: Subject to any disclaimer, the term of this patent is extended or adjusted under 35 U.S.C. 154(b) by 31 days.

(21) Appl. No.: 17/131,036

(22) Filed: Dec. 22, 2020

(65) Prior Publication Data

US 2021/0109414 A1 Apr. 15, 2021

Related U.S. Application Data

(63) Continuation of application No. PCT/JP2019/024809, filed on Jun. 21, 2019.

(30) Foreign Application Priority Data

Jul. 3, 2018 (JP) ................................. 2018-126793

(51) Int. Cl.
*G02F 1/1362* (2006.01)
*G09G 3/36* (2006.01)
*G02F 1/1343* (2006.01)

(52) U.S. Cl.
CPC ..... *G02F 1/136286* (2013.01); *G09G 3/3614* (2013.01); *G09G 3/3659* (2013.01);
(Continued)

(58) Field of Classification Search
CPC .......... G09G 3/3614; G09G 2300/0452; G02F 1/136286; G02F 2201/122; G02F 2201/52
See application file for complete search history.

(56) References Cited

U.S. PATENT DOCUMENTS 9,625,757 B2* 4/2017 Oono ................ G02F 1/134363
9,653,033 B2* 5/2017 Kobayashi ........... G09G 3/3648
(Continued)

FOREIGN PATENT DOCUMENTS

JP  2000029072 A  1/2000
JP  2015225300 A  12/2015
(Continued)

OTHER PUBLICATIONS

International Search Report issued in Application No. PCT/JP2019/024809, dated Sep. 10, 2019.

*Primary Examiner* — Paisley L Wilson
(74) *Attorney, Agent, or Firm* — K&L Gates LLP

(57) ABSTRACT

A display device includes: a first pixel including a first sub-pixel, a second sub-pixel, and a third sub-pixel; and a second pixel including the first sub-pixel, the second sub-pixel, and a fourth sub-pixel. The first pixel and the second pixel are alternately arranged in a row direction and a column direction. The third sub-pixel and the fourth sub-pixel are alternately arranged in the column direction. A branch electrode in one of two first sub-pixels adjacent in the column direction extends in a first direction, and a branch electrode in the other thereof extends in a second direction. A branch electrode in one of two second sub-pixels adjacent in the column direction extends in the first direction, and a branch electrode in the other thereof extends in the second direction. Each branch electrode in the third sub-pixel and the fourth sub-pixel includes a bending portion.

11 Claims, 16 Drawing Sheets

(52) U.S. Cl.
CPC .. *G02F 1/134363* (2013.01); *G02F 1/134372* (2021.01); *G02F 2201/122* (2013.01); *G02F 2201/123* (2013.01); *G02F 2201/52* (2013.01); *G09G 2300/0452* (2013.01)

(56) References Cited

U.S. PATENT DOCUMENTS

| | | | |
|---|---|---|---|
| 10,347,695 B2* | 7/2019 | Chang | ................ H01L 27/3216 |
| 2002/0191139 A1 | 12/2002 | Kim et al. | |
| 2015/0346572 A1 | 12/2015 | Hirosawa | |
| 2015/0371597 A1 | 12/2015 | Shimmen | |
| 2016/0062196 A1 | 3/2016 | Takahashi et al. | |
| 2016/0085122 A1 | 3/2016 | Nishihara et al. | |
| 2016/0116807 A1 | 4/2016 | Lim et al. | |
| 2016/0225331 A1* | 8/2016 | Higano | ............. G02F 1/134309 |

FOREIGN PATENT DOCUMENTS

| | | |
|---|---|---|
| JP | 2016004177 A | 1/2016 |
| JP | 2016050987 A | 4/2016 |
| WO | 2014185122 A1 | 11/2014 |

* cited by examiner

DISPLAY DEVICE WITH MULTI-DOMAIN METHOD

CROSS-REFERENCE TO RELATED APPLICATION

This application claims the benefit of priority from Japanese Patent Application No. 2018-126793 filed on Jul. 3, 2018 and International Patent Application No. PCT/JP2019/024809 filed on Jun. 21, 2019, the entire contents of which are incorporated herein by reference.

BACKGROUND

1. Technical Field

The present disclosure relates to a display device.

2. Description of the Related Art

It is known that there is a what-is-called multi-domain display device having a plurality of types of sub-pixels with different orientations (for example, Japanese Patent Application Laid-open Publication No. 2000-29072 and International Publication WO 2014/185122).

When the multi-domain method is employed, a flicker due to generation of difference in luminance between before and after switching of inversion driving can be visually recognized depending on methods of the inversion driving that is performed in a liquid crystal panel.

For the foregoing reasons, there is a need for a display device capable of preventing a flicker more reliably.

SUMMARY

According to an aspect, a display device includes: a first pixel including a sub-pixel of a first color, a sub-pixel of a second color, and a sub-pixel of a third color; and a second pixel including the sub-pixel of the first color, the sub-pixel of the second color, and a sub-pixel of a fourth color. The first pixel and the second pixel are alternately arranged in a row direction and a column direction. The sub-pixel of the third color and the sub-pixel of the fourth color are alternately arranged in the column direction. Each of the sub-pixels includes a pixel electrode including a branch electrode extending in a predetermined direction. The branch electrode included in one of two sub-pixels of the first color that are adjacent to each other in the column direction has a main portion extending in a first extension direction, and the branch electrode included in the other of the two sub-pixels of the first color has a main portion extending in a second extension direction different from the first extension direction. The branch electrode included in one of two sub-pixels of the second color that are adjacent to each other in the column direction has a main portion extending in the first extension direction, and the branch electrode included in the other of the two sub-pixels of the second color has a main portion extending in the second extension direction. The first extension direction and the second extension direction are different from the row direction and the column direction. Each of the branch electrode included in the sub-pixel of the third color and the branch electrode included in the sub-pixel of the fourth color includes a bending portion.

DETAILED DESCRIPTION

Figure 1:
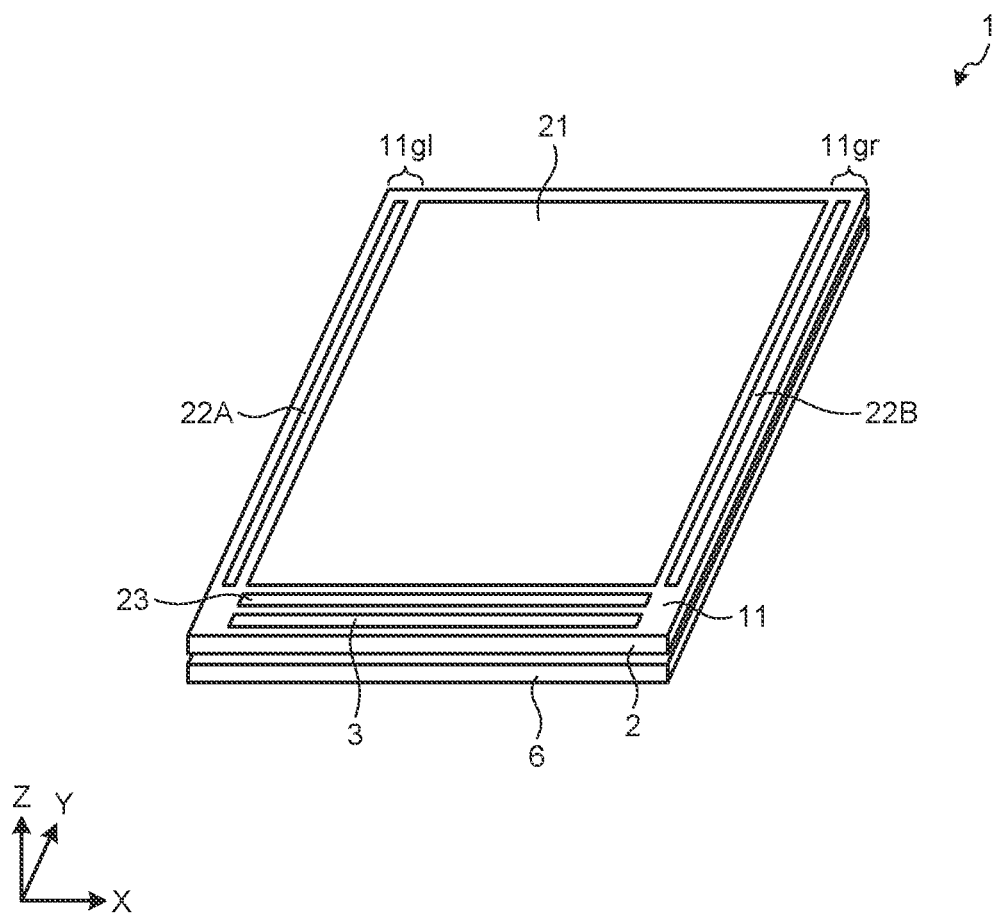
FIG. 1 is a descriptive view for explaining an example of a display device according to an embodiment.

Hereinafter, embodiments of the present disclosure will be described with reference to the drawings. What is disclosed herein is merely an example, and it is needless to say that appropriate changes within the gist of the invention at which those skilled in the art can easily arrive are encompassed in the range of the present invention. In the drawings, widths, thicknesses, shapes, and the like of the components can be schematically illustrated in comparison with actual modes for more clear explanation. They are however merely examples and do not limit interpretation of the present invention. In the present specification and the drawings, the same reference numerals denote components similar to those described before with reference to the drawing that has been already referred, and detail explanation thereof can be appropriately omitted.

In this disclosure, when an element is described as being "on" another element, the element can be directly on the other element, or there can be one or more elements between the element and the other element.

Figure 2:
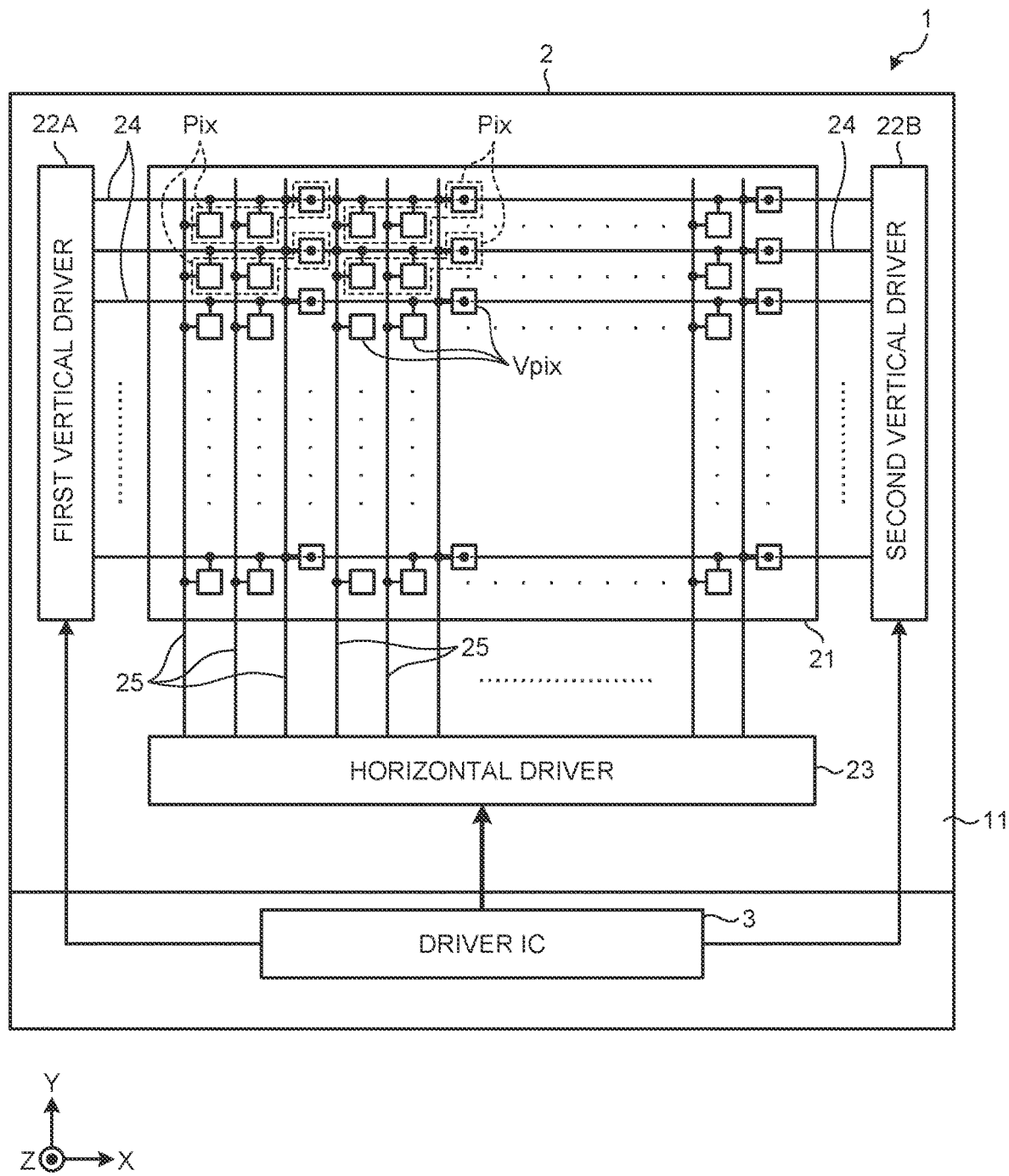
FIG. 2 is a block diagram illustrating an example of a system of the display device in FIG. 1.

FIG. 1 is a descriptive view for explaining an example of a display device 1 according to an embodiment. FIG. 2 is a block diagram illustrating an example of a system of the display device 1 in FIG. 1. The drawings including FIG. 1 to be referred in explanation are schematic, and dimensions and shapes therein are not necessarily the same as actual ones.

The display device 1 includes a display panel 2, a driver IC 3, and a backlight 6. The display device 1 may be a transmissive or transflective display device or a reflective display device including no backlight. A flexible printed circuits (FPC), which is not illustrated, transmits an external signal to the driver IC 3 or drive power for driving the driver IC 3. The display panel 2 includes a translucent insulating substrate, for example, a glass substrate 11, a display region 21 provided on the surface of the glass substrate 11 and formed by arranging a large number of pixels Pix in a matrix (row-column configuration) along row and column directions, a horizontal driver (horizontal drive circuit) 23, a first vertical driver 22A, and a second vertical driver 22B. The first vertical driver 22A and the second vertical driver 22B are vertical drive circuits. Although the first vertical driver 22A and the second vertical driver 22B are arranged so as to interpose the display region 21 therebetween in plan view, only any one of the first vertical driver 22A and the second vertical driver 22B may be provided. The glass substrate 11 includes a first substrate on which a large number of pixel circuits including active elements (for example, transistors) are arranged and a second substrate provided so as to oppose the first substrate with a predetermined space therebetween. The glass substrate 11 has a liquid crystal layer 54 (see FIG. 4) formed by sealing liquid crystal between the first substrate and the second substrate. The horizontal driver 23, the first vertical driver 22A, and the second vertical driver 22B are provided on the first substrate and are therefore also referred to as peripheral circuits. Hereinafter, a row direction in which the pixels Pix are arrayed is an X direction and a column direction is a Y direction. A direction orthogonal to an X-Y plane is a Z direction.

Frame regions 11gr and 11gl of the display panel 2 are non-display regions provided on the glass substrate 11 and located on the outer side of the display region 21 in which a large number of pixels Pix including liquid crystal elements LC (see FIG. 3) are arranged. The first vertical driver 22A and the second vertical driver 22B are arranged in the frame regions 11gr and 11gl.

The backlight 6 is arranged on the back surface side (surface on the opposite side to the surface on which an image is displayed) of the display panel 2. The backlight 6 emits light toward the display panel 2 to cause the light to be incident on the entire surface of the display region 21. The backlight 6 includes, for example, a light source and a light guide plate guiding light emitted from the light source to cause the light to be output toward the back surface of the display panel 2.

The display panel 2 includes, on the glass substrate 11, the display region 21, the driver IC 3 having functions of an interface (I/F) and a timing generator, the first vertical driver 22A, the second vertical driver 22B, and the horizontal driver 23.

In the display region 21, a plurality of units of sub-pixels Vpix including the liquid crystal layer 54 (see FIG. 4) are arranged along the X-Y plane, and each unit forms one pixel for display. Each pixel Pix includes three sub-pixels Vpix. A plurality of scan lines 24 run along the X direction in the display region 21. A plurality of signal lines 25 run along the direction intersecting with the X direction in the display region 21.

In the display region 21, the scan lines 24 and the signal lines 25 overlap with a black matrix in X-Y plane view. Areas of the display region 21 in which no black matrix is arranged correspond to openings.

A master clock, a horizontal synchronization signal, and a vertical synchronization signal as external signals are externally input to the display panel 2 and are supplied to the driver IC 3. The driver IC 3 performs level shift (boosting) on the master clock, the horizontal synchronization signal, and the vertical synchronization signal, which have a voltage amplitude of an external power supply, into those having a voltage amplitude of an internal power supply necessary for driving the liquid crystal to generate a master clock, a horizontal synchronization signal, and a vertical synchronization signal. The driver IC 3 supplies the generated master clock, horizontal synchronization signal, and vertical synchronization signal to the first vertical driver 22A, the second vertical driver 22B, and the horizontal driver 23. The driver IC 3 generates a common potential that is common to the pixel Pix and is to be applied to pixel electrodes 72 (see FIG. 5) in the respective sub-pixels Vpix and applies it to the display region 21.

The first vertical driver 22A and the second vertical driver 22B include shift registers and latch circuits. In each of the first vertical driver 22A and the second vertical driver 22B, the latch circuit sequentially samples and latches display data output from the driver IC 3 in one horizontal period in synchronization with a vertical clock pulse. Each of the first vertical driver 22A and the second vertical driver 22B sequentially outputs digital data for one horizontal line that has been latched in the latch circuit as a vertical scanning pulse and supplies it to the scan line 24 as a scanning target to sequentially select the sub-pixels Vpix row by row. The first vertical driver 22A and the second vertical driver 22B are arranged so as to interpose the scan lines 24 therebetween. The first vertical driver 22A and the second vertical driver 22B output the digital data to the scan lines 24 in the order from the upper side of the display region 21, that is, from the top side in the vertical scanning direction, to the lower side of the display region 21, that is, to the bottom side in the vertical scanning direction, for example. The first vertical driver 22A and the second vertical driver 22B may output the digital data to the scan lines 24 in the order from the lower side of the display region 21, that is, from the bottom side in the vertical scanning direction, to the upper side of the display region 21, that is, to the top side in the vertical scanning direction. The top side in the vertical scanning is any one side of two sides along the arrangement direction of the scan lines 24. The bottom side is the side opposite to the top side.

Display data of red (R), green (G), blue (B), and white (W) of a predetermined number of bits (for example, 6 bits) is applied to the horizontal driver 23. The horizontal driver 23 writes, through the signal lines 25, the display data into the sub-pixels Vpix in a row selected in the vertical scanning performed by the first vertical driver 22A and the second vertical driver 22B in units of a pixel Pix, in units of a plurality of pixels Pix, or in one unit of all the pixels Pix. In the embodiment, red (R) is a first color, green (G) is a second color, blue (B) is a third color, and white (W) is a fourth color. They are however examples, and the colors are not limited thereto. The first color, the second color, the third color, and the fourth color can be appropriately changed to other colors. For example, the fourth color may be yellow (Y). The first color, the second color, and the third color may be respectively cyan (C), magenta (M), and yellow (Y). In this case, the fourth color is a color other than cyan (C), magenta (M), and yellow (Y).

Figure 3:
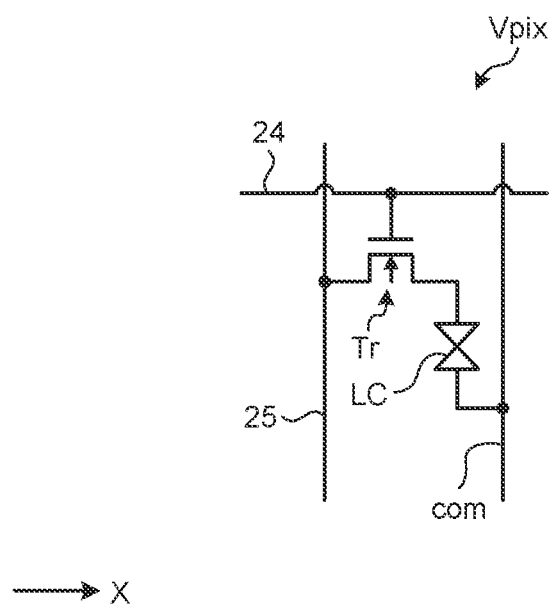
FIG. 3 is a circuit diagram illustrating an example of a drive circuit configured to drive sub-pixels.

FIG. 3 is a circuit diagram illustrating an example of a drive circuit configured to drive the sub-pixels Vpix. The signal lines 25 supplying pixel signals as display data to thin film transistors (TFT) Tr, which are illustrated in FIG. 3, of the respective sub-pixels Vpix, the scan lines 24 driving the thin film transistors Tr, and other wiring lines are provided in the display region 21. As described above, the signal lines 25 extend in a plane parallel with the surface of the above-mentioned glass substrate 11 and supply the pixel signals for displaying images to the sub-pixels Vpix. The sub-pixels Vpix include the thin film transistors Tr and the liquid crystal elements LC. The thin film transistors Tr are fabricated from n-channel metal oxide semiconductor (MOS)-type TFTs in this example. One of a source and a drain of each thin film transistor Tr is coupled to the signal line 25, a gate thereof is coupled to the scan line 24, and the other of the source and the drain thereof is coupled to one end of the liquid crystal element LC. One end of each liquid crystal element LC is coupled to the thin film transistor Tr and the other end thereof is coupled to a common electrode com.

The sub-pixel Vpix is coupled to the other sub-pixels Vpix belonging to the same row in the display region 21 by the corresponding scan line 24. The first vertical driver 22A and the second vertical driver 22B alternately apply a vertical scanning pulse to the scan lines 24 in the scanning direction. The sub-pixel Vpix is coupled to the other sub-pixels Vpix belonging to the same column in the display region 21 by the corresponding signal line 25. The signal lines 25 are coupled to the horizontal driver 23 and supplied with the pixel signals from the horizontal driver 23. The common electrodes com are coupled to a drive electrode driver (not illustrated) and supplied with a voltage from the drive electrode driver. The common electrodes com may be coupled to a common line (not illustrated) for supplying a common voltage. The sub-pixel Vpix is coupled to the other sub-pixels Vpix belonging to the same column in the display region 21 by the corresponding common electrode com.

The first vertical driver 22A and the second vertical driver 22B illustrated in FIG. 1 and FIG. 2 each apply the vertical scanning pulse to the gates of the thin film transistors Tr of the sub-pixels Vpix through the scan line 24 illustrated in FIG. 3, thereby sequentially selecting, as a display drive target, one row (one horizontal line) of the sub-pixels Vpix formed in the display region 21. The horizontal driver 23 illustrated in FIG. 1 and FIG. 2 supplies, through the signal lines 25 illustrated in FIG. 3, the pixel signals to the sub-pixels Vpix included in one horizontal line that the first vertical driver 22A and the second vertical driver 22B sequentially select. These sub-pixels VPix display one horizontal line in accordance with the supplied pixel signals. In this display operation, the drive electrode driver applies voltage to the common electrodes com corresponding to the one horizontal line.

Figure 4:
FIG. 4 is a cross-sectional view illustrating an example of a display panel.

Next, details of the configuration of the display region 21 will be described. FIG. 4 is a cross-sectional view illustrating an example of the display panel 2. As illustrated in FIG. 4, the display panel 2 includes a first substrate (upper substrate) 50, a second substrate (lower substrate) 52 arranged so as to oppose the first substrate 50 in the Z direction, and the liquid crystal layer 54 inserted between the first substrate 50 and the second substrate 52. The backlight 6 is arranged on the surface of the first substrate 50 on the opposite side to the liquid crystal layer 54. The first substrate 50, the second substrate 52, and the multilayered structures included in the first substrate 50 and the second substrate 52 are along the X-Y plane.

The liquid crystal layer 54 modulates light passing therethrough in accordance with a state of an electric field. Liquid crystal molecules contained in the liquid crystal layer 54 forms the liquid crystal elements LC in units of the sub-pixels Vpix. In the embodiment, a transverse electric field mode such as fringe field switching (FFS) mode and in-plane switching (IPS) mode is employed. That is to say, the liquid crystal molecules rotate in a plane parallel with the two substrates (the first substrate 50 and the second substrate 52) between the two substrates. To be specific, the liquid crystal molecules are driven so as not to rotate in a direction of rising in a stacking direction (Z direction) of the two substrates but to change their orientation angles along the plane orthogonal to the stacking direction.

The first substrate 50 has a pixel substrate 60 made with a translucent substrate 71 such as glass, a first orientation film 62 stacked on the liquid crystal layer 54 side of the pixel substrate 60, and a first polarizing plate 63 stacked on the opposite side of the pixel substrate 60 to the liquid crystal layer 54 side. The pixel substrate 60 will be described later. The first orientation film 62 orients the liquid crystal molecules in the liquid crystal layer 54 to a predetermined direction and is in direct contact with the liquid crystal layer 54. The first orientation film 62 is made of, for example, a polymer material such as polyimide and is formed by, for example, performing orientation processing on applied polyimide or the like. The first polarizing plate 63 has a function of converting light incident from the backlight 6 side into linearly polarized light.

The second substrate 52 has a counter substrate 64 made with a translucent substrate such as glass, color filters 66 provided on the liquid crystal layer 54 side of the counter substrate 64, a second orientation film 67 provided on the liquid crystal layer 54 side of the layer of the color filters 66, a phase difference plate 68 provided on the opposite side of the counter substrate 64 to the liquid crystal layer 54 side, and a second polarizing plate 69 provided on the opposite side of the phase difference plate 68 to the counter substrate 64 side. The layer of the color filters 66 includes color regions colored in three colors: red (R), green (G), and blue (B), for example. The layer of the color filters 66 in the embodiment includes a region that is not colored and transmits light in all colors. Hereinafter, the region that is not colored is referred to as a color region of white (W). The layer of the color filters 66 includes color regions of four colors: for example, red (R), green (G), blue (B), and white (W), which correspond to the openings of a lattice black matrix. The colors of the sub-pixels Vpix depend on the colors of the color filters 66 when the color filters 66 are provided thereto.

The color filters 66 oppose the liquid crystal layer 54 in the Z direction. The color filters 66 may be colored in a combination of other colors as long as it is colored in different colors. In general, in the color filters 66, the luminance in the color region of green (G) is higher than those of the color region of red (R) and the color region of blue (B). A black matrix may be provided for partitioning the color filters 66 on a sub-pixel Vpix basis. The black matrix is shaped into a lattice by being provided at the boundaries of the sub-pixels Vpix that are two-dimensionally arranged. The black matrix is made of a material having high light absorptivity.

The second orientation film 67 orients the liquid crystal molecules in the liquid crystal layer 54 to a predetermined direction and is in direct contact with the liquid crystal layer 54 in a similar manner to the first orientation film 62. The second orientation film 67 is made of, for example, a polymer material such as polyimide and is formed by, for example, performing orientation processing on applied polyimide or the like. The phase difference plate 68 has a function of compensating for reduction in the viewing angle that is caused by the first polarizing plate 63 and the second polarizing plate 69. The second polarizing plate 69 has a function of absorbing a linearly polarized light component parallel with a polarizing plate absorbing axis and transmitting a polarized light component orthogonal thereto. The second polarizing plate 69 has a function of transmitting/blocking light depending on ON/OFF states of the liquid crystal. One surface of the second polarizing plate 69 located on the opposite side to the phase difference plate 68 corresponds to a display surface in the embodiment.

As described above, in the embodiment, the orientation of the liquid crystal molecules in the liquid crystal elements LC included in the respective sub-pixels Vpix depends on the first orientation film 62 and the second orientation film 67.

Figure 5:
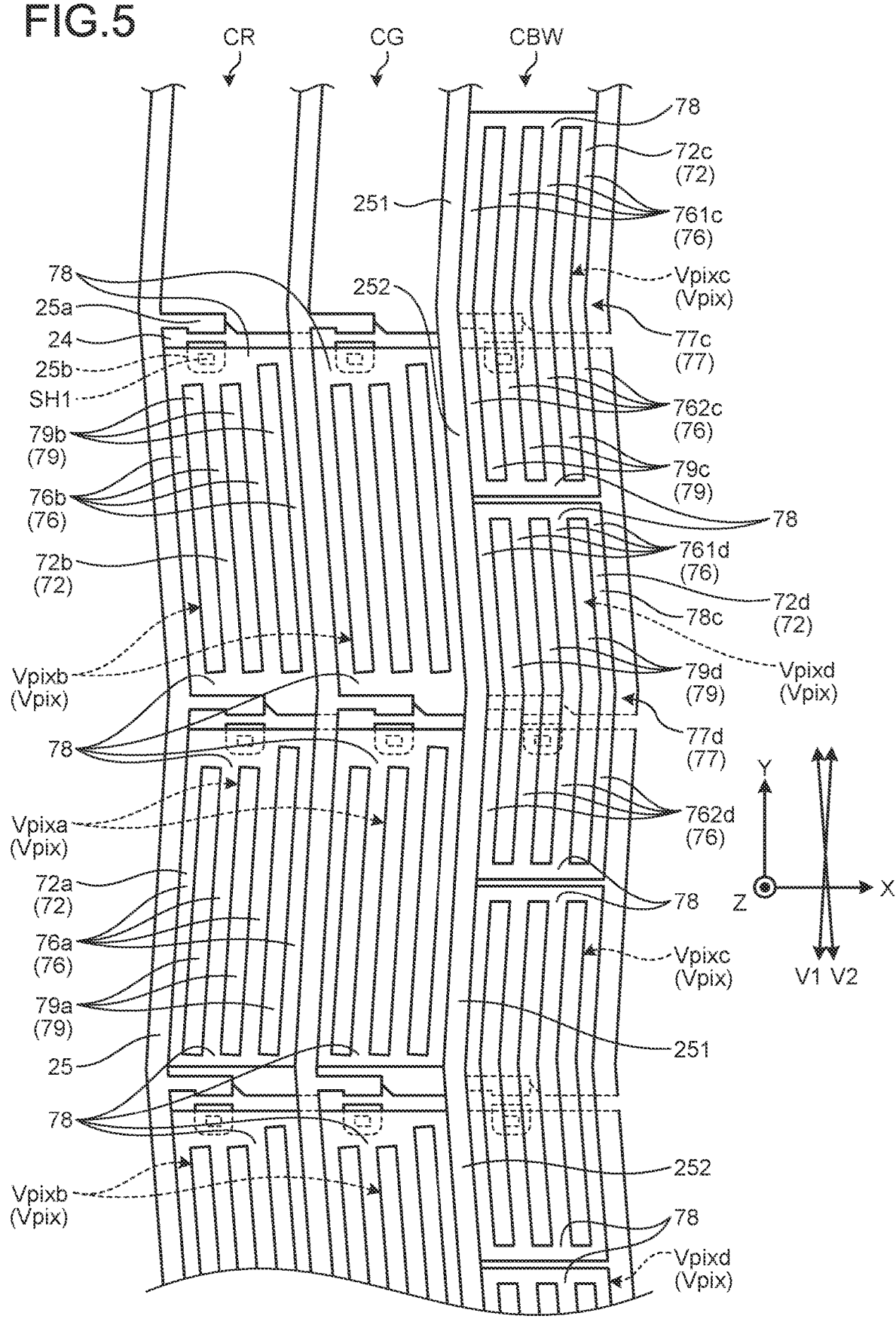
FIG. 5 is a schematic diagram illustrating an arrangement relation between scan lines, signal lines, and pixel electrodes, and shapes thereof.
Figure 6:
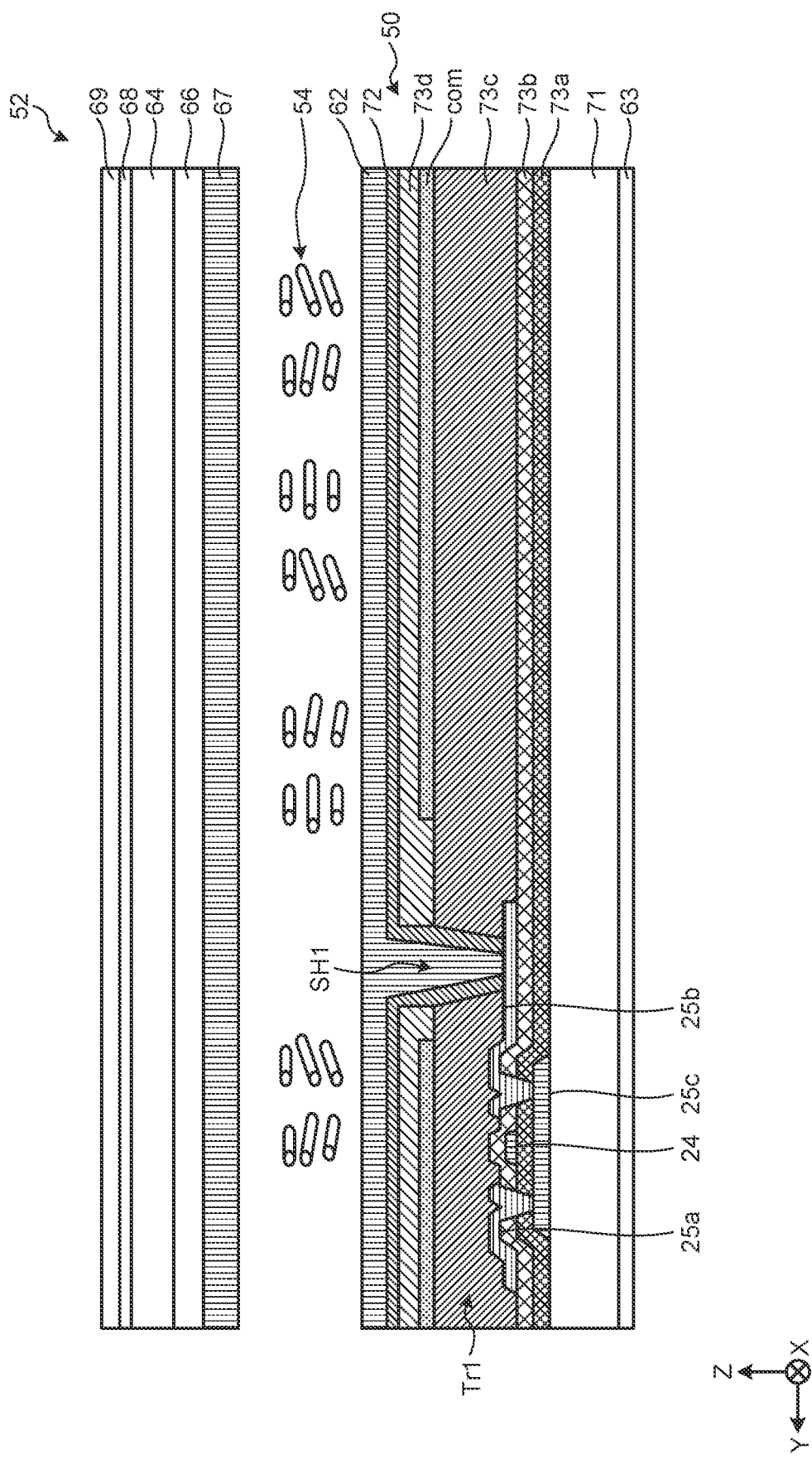
FIG. 6 is a cross-sectional view schematically illustrating the main configuration for switching the sub-pixels.

Next, the main configuration of the pixel substrate 60 will be described with reference to FIG. 5 and FIG. 6. FIG. 5 is a schematic diagram illustrating an arrangement relation between the scan lines 24, the signal lines 25, and the pixel electrodes 72, and shapes thereof. FIG. 6 is a cross-sectional view schematically illustrating the main configuration for switching the sub-pixels Vpix. The pixel substrate 60 is a TFT substrate including the translucent substrate 71 on which various circuits are provided. The pixel substrate 60 includes the pixel electrodes 72 and the common electrodes com that are provided on the translucent substrate 71. As illustrated in FIG. 6, the pixel electrodes 72 and the common electrodes com are insulated from each other by a fourth insulating film 73d and oppose each other in the Z direction. The pixel electrodes 72 and the common electrodes com are translucent electrodes made of a translucent conductive material such as indium tin oxide (ITO).

When the thin film transistors Tr as the switching elements of the sub-pixels Vpix illustrated in FIG. 3 are referred to as transistors Tr1, the pixel substrate 60 is configured by stacking, on the translucent substrate 71, islands 25c and wiring such as the signal lines 25 supplying the pixel signals to the pixel electrodes 72 and the scan lines 24 driving the transistors Tr1. The islands 25c are semiconductor layers on which the above-mentioned transistors Tr1 as the switching elements of the sub-pixels Vpix are provided.

As illustrated in FIG. 5 and FIG. 6, the scan line 24 crosses a part of the island 25c with grade separation and acts as the gate of the transistor Tr1. In the transistor Tr1, an n-channel region ch is patterned by electric coupling between a source line 25a, a drain line 25b, and the island 25c. The semiconductor layer is made of, for example, low-temperature polysilicon. The signal line 25 extends in a plane parallel with the surface of the translucent substrate 71 and supply the pixel signal for displaying an image to the pixel Pix. A part of the semiconductor layer is in contact with the source line 25a of the signal line 25, and another part thereof is electrically coupled to the drain line 25b formed in the same layer as the signal line 25. The drain line 25b in the embodiment is electrically coupled to the pixel electrode 72 through a through-hole SH1. In the embodiment, the scan line 24 is wiring made of metal such as molybdenum (Mo) and aluminum (Al), and the signal line 25 is wiring made of metal such as aluminum. The pixel substrate 60 in the embodiment has the configuration in which the islands 25c, a first insulating film 73a, the scan lines 24, a second insulating film 73b, the signal lines 25 (including the source lines 25a and the drain lines 25b), a third insulating film 73c, the common electrodes com, the fourth insulating film 73d, and the pixel electrodes 72 are stacked on the translucent substrate 71 in the order as listed.

The first insulating film 73a, the second insulating film 73b, the third insulating film 73c, and the fourth insulating film 73d in the embodiment are made of an inorganic insulating material such as SiNx (silicon nitride) and silicon oxide or an organic insulating material such as polyimide resin. The material forming the layers of the first insulating film 73a, the second insulating film 73b, the third insulating film 73c, and the fourth insulating film 73d is not limited thereto. The first insulating film 73a, the second insulating film 73b, the third insulating film 73c, and the fourth insulating film 73d may be made of the same insulating material, and some or all of them may be made of different insulating materials.

As illustrated in FIG. 5, the pixel electrodes 72 of the pixel substrate 60 have openings 79 corresponding to the sub-pixels Vpix. Of electric fields formed between the common electrodes com and the pixel electrodes 72, electric fields (fringe electric fields) leaking from the openings 79 in the pixel electrodes 72 drive the liquid crystal molecules. In this manner, the display panel 2 in the embodiment is a liquid crystal panel rotating the liquid crystal molecules in the liquid crystal layer 54 provided between the two opposing substrates (the pixel substrate 60 and the counter substrate 64) based on potentials applied to the electrodes (pixel electrodes 72) provided on one substrate (for example, the pixel substrate 60) of the two substrates.

The pixel electrode 72 includes branch electrodes 76 arrayed in the X direction with the openings (slits) 79 interposed therebetween. In other words, one opening 79 is formed between the two branch electrodes 76 arrayed in the X direction. The extension direction of the branch electrodes 76 and the openings 79 contributes to the rotating direction of the liquid crystal when voltage is applied. The rotating direction depends on the orientation directions of the first orientation film 62 and the second orientation film 67 when no voltage is applied, and the rotating direction is, for example, along the Y direction. In the embodiment, the branch electrodes 76 arrayed with the openings 79 interposed therebetween are coupled by coupling portions 78 at both ends in the Y direction. The openings 79 may not however be provided. That is to say, each of the pixel electrodes 72 may have one branch electrode 76. End portions of the branch electrodes 76 may not be coupled to each other by the coupling portions 78. In the embodiment, a portion of each of the branch electrodes 76 that extends in the lengthwise direction and defines the orientation direction of the liquid crystal molecules when the voltage is applied in the sub-pixels Vpix, is referred to as a "main portion of the branch electrode 76" in some cases. In the embodiment, the main portion of the branch electrode 76 extends in the direction intersecting with the scan lines 24 and substantially extends along the extension direction of the signal lines 25 (first portions 251 or second portions 252, which will be described later). The entire opening 79 or most of the opening 79 that is formed to be interposed between the main portions of the branch electrodes 76 is referred to as a "main portion of the opening 79" in some cases.

The sub-pixels Vpix in the embodiment are classified into four types including a sub-pixel Vpixa, a sub-pixel Vpixb, a sub-pixel Vpixc, and a sub-pixel Vpixd based on difference in characteristics of the main portions of the branch electrodes 76. In the sub-pixel Vpixa, the direction of the main portions of first branch electrodes 76a and the direction of the main portions of first openings 79a are along a first extension direction V1. In the sub-pixel Vpixb, the direction of the main portions of first branch electrodes 76b and the direction of the main portions of first openings 79b are along the second extension direction V2.

In the sub-pixel Vpixc and the sub-pixel Vpixd, the main portions of the branch electrodes 76 include bending portions 77. The main portion of the branch electrode 76 in the sub-pixel Vpixc include a first extension electrode 761c along a first extension direction V1 and a second extension electrode 762c along a second extension direction V2. The first extension electrode 761c and the second extension electrode 762c are continuous to each other with a bending portion 77c interposed therebetween. A third opening 79c formed by the first extension electrodes 761c, the bending portion 77c, and the second extension electrodes 762c bends at a position corresponding to the bending portion 77c and includes a portion along the first extension direction V1 and a portion along the second extension direction V2 with the bending position interposed therebetween. The main portion of the branch electrode 76 in the sub-pixel Vpixd includes a third extension electrode 761d along the second extension direction V2 and a fourth extension electrode 762d along the first extension direction V1. The third extension electrode 761d and the fourth extension electrode 762d are continuous to each other with a bending portion 77d interposed therebetween. A fourth opening 79d formed by the third extension electrodes 761d, the bending portion 77d, and the fourth extension electrodes 762d bends at a position corresponding to the bending portion 77d and includes a portion along the second extension direction V2 and a portion along the first extension direction V1 with the bending position interposed therebetween.

The direction of the angle (smaller than 180 degrees) of the bending portion 77c and the direction of the angle (smaller than 180 degrees) of the bending portion 77d are opposite to each other. The angle of the bending portion 77c formed by the first extension electrode 761c and the second extension electrode 762c faces one side in the X direction. The angle of the bending portion 77d formed by the third extension electrode 761d and the fourth extension electrode 762d faces the other side in the X direction.

The signal lines 25 in the embodiment are provided in parallel with the main portions of the branch electrodes 76. To be specific, the signal lines 25 each include the first portions 251 along the first extension direction V1 and the second portions 252 along the second extension direction V2. The first portions 251 are along the first branch electrodes 76a, the first extension electrodes 761c, and the fourth extension electrodes 762d. The second portions 252 are along the second branch electrodes 76b, the second extension electrodes 762c, and the third extension electrodes 761d.

The first extension direction V1 and the second extension direction V2 preferably form the same angle with at least one of the X direction and the Y direction such that they are symmetric with each other with respect to the at least one direction. The first extension direction V1 and the second extension direction V2 may not be symmetric with each other and form different angles with the at least one direction.

In the embodiment, when the first branch electrodes 76a, the second branch electrodes 76b, the first extension electrodes 761c, the second extension electrodes 762c, the third extension electrodes 761d, and the fourth extension electrodes 762d are not distinguished from one another, they are simply referred to as the branch electrodes 76. When the first openings 79a, the second openings 79b, the third openings 79c, and the fourth openings 79d are not distinguished from one another, they are simply referred to as the openings 79.

In the display region 21 in the embodiment, three pixel columns: a first column CR, a second column CG, and a third column CBW, are repeatedly arranged in the order of the first column CR, the second column CG, the third column CBW, the first column CR, the second column CG, the third column CBW, and so on from one side (left side in FIG. 1 and FIG. 5) to the other side in the X direction. The arrangement order of the first column CR, the second column CG, the third column CBW in the X direction in one cycle is not limited thereto and can be appropriately changed.

In each of the first column CR and the second column CG, the sub-pixel Vpixa and the sub-pixel Vpixb are alternately arranged along the Y direction. In the third column CBW, the sub-pixel Vpixc and the sub-pixel Vpixd are alternately arranged along the Y direction.

The color of the sub-pixels Vpix in the first columns CR, the color of the sub-pixels Vpix in the second columns CG, and the color of the sub-pixels Vpix in the third columns CBW are different from one another. The difference in the color of the sub-pixel Vpix is defined in accordance with difference in the spectrum of light passing through the color filter 66. The sub-pixels Vpix in the first column CR, the sub-pixels Vpix in the second column CG, and the sub-pixels Vpix in the third column CBW are provided with the color filters 66 different in color. The color filters 66 for the sub-pixels Vpix are partitioned by the black matrix.

The color filter 66 of red (R) is provided for the sub-pixels Vpix in the first columns CR. The color filter 66 of green (G) is provided for the sub-pixels Vpix in the second columns CG. The color filter 66 of blue (B) or white (W) is provided for the sub-pixels Vpix in the third columns CBW. The color filter of white (W) is colorless filter applied with transparent resin or colorless filter applied with no resin, for example. The openings for which no color filter 66 is provided may be provided instead of provision of the color filter 66 of white (W), in order to provide the sub-pixels Vpix of white (W).

The pixel electrodes 72 included in the sub-pixels Vpix of red (R) arranged in the first columns CR and the sub-pixels Vpix of green (G) arranged in the second columns CG are first pixel electrodes 72a or second pixel electrodes 72b. The pixel electrodes 72 included in the sub-pixels Vpix of blue (B) and white (W) arranged in the third columns CBW are third pixel electrodes 72c or fourth pixel electrodes 72d.

Three sub-pixels Vpix forming one pixel Pix include one sub-pixel Vpix provided in the first column CR, one sub-pixel Vpix provided in the second column CG, and one sub-pixel Vpix provided in the third column CBW. The pixel Pix including the sub-pixel Vpix of blue (B) among the sub-pixels Vpix in the third column CBW, is a first pixel. The pixel Pix including the sub-pixel Vpix of white (W) among the sub-pixels Vpix in the third column CBW, is a second pixel.

The sub-pixels Vpixa in the first columns CR and the sub-pixels Vpixa in the second columns CG are arrayed in the X direction. The sub-pixels Vpixb in the first columns CR and the sub-pixels Vpixb in the second columns CG are arrayed in the X direction. In this manner, in the sub-pixels Vpix included in the first column CR and the second column CG, the directions of the main portions of the branch electrodes 76 and the main portions of the openings 79 included in the two sub-pixels Vpix adjacent in the X direction are the same. In the sub-pixel Vpixa in the first column CR and the sub-pixel Vpixa in the second column CG included in one pixel Pix, the directions of the main portions of the branch electrodes 76 and the main portions of the openings 79 are the same. One pixel Pix further includes the sub-pixel Vpix in the third column CBW adjacent to one of the sub-pixel Vpixa in the first column CR and the sub-pixel Vpixa in the second column CG in which the directions of the main portions of the branch electrodes 76 and the main portions of the openings 79 are the same as described above. Consequently, a combination of the sub-pixels Vpix included in one pixel Pix is any one of a combination of two sub-pixels Vpixa and one sub-pixel Vpixc, a combination of two sub-pixels Vpixa and one sub-pixel Vpixd, a combination of two sub-pixels Vpixb and one sub-pixel Vpixc, and a combination of two sub-pixels Vpixb and one sub-pixel Vpixd.

Each pixel Pix in the embodiment includes one sub-pixel Vpix in the first column CR, one sub-pixel Vpix in the second column CG, and one sub-pixel Vpix in the third column CBW adjacent to the second column CG. The pixel Pix may include the sub-pixel Vpix in the third column CBW adjacent to the first column CR instead of the sub-pixel Vpix in the third column CBW adjacent to the second column CG.

Figure 7:
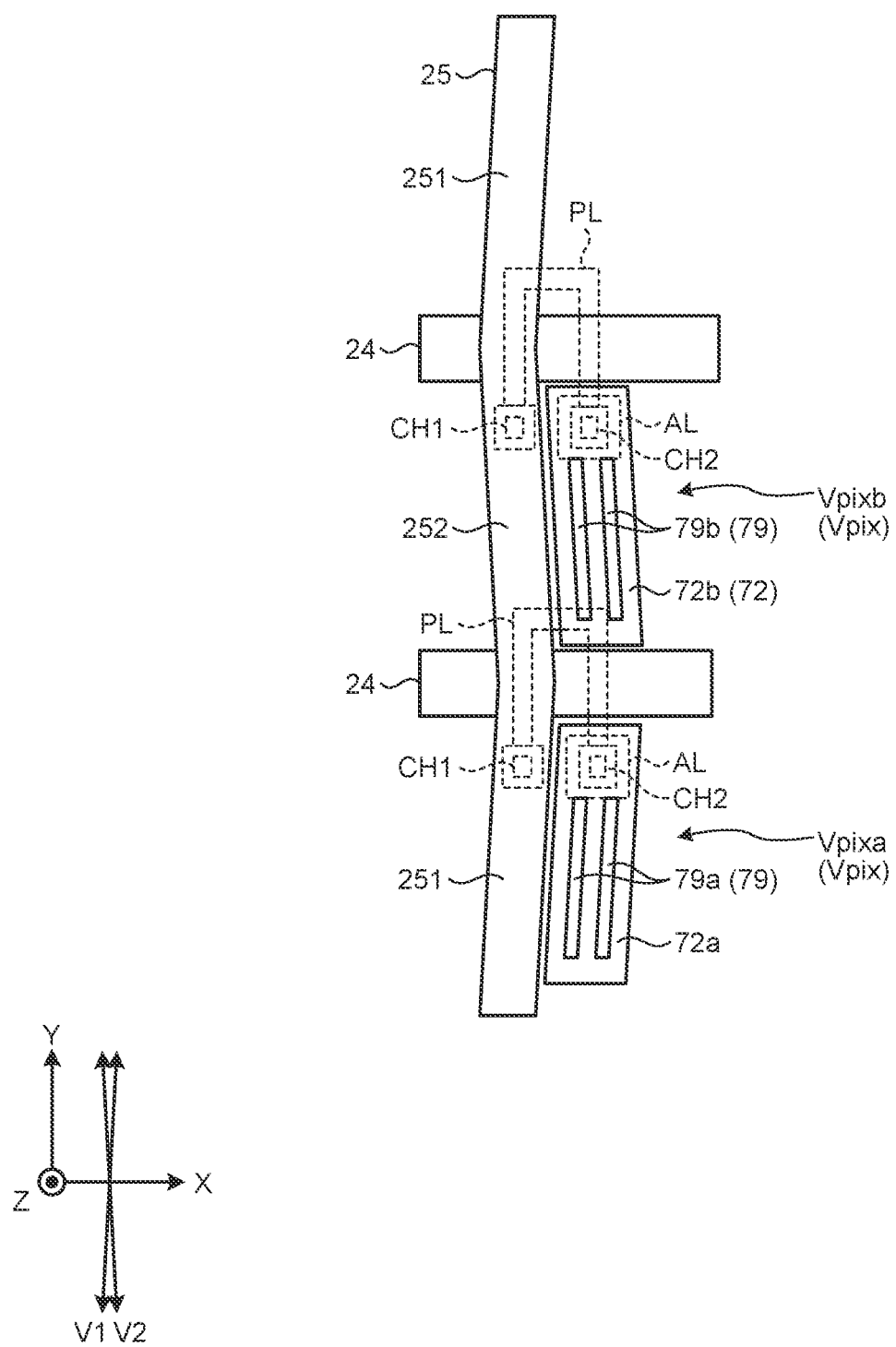
FIG. 7 is a schematic diagram illustrating a relation between the scan lines, the signal lines, and the pixel electrodes that is different from that in FIG. 5.
Figure 8:
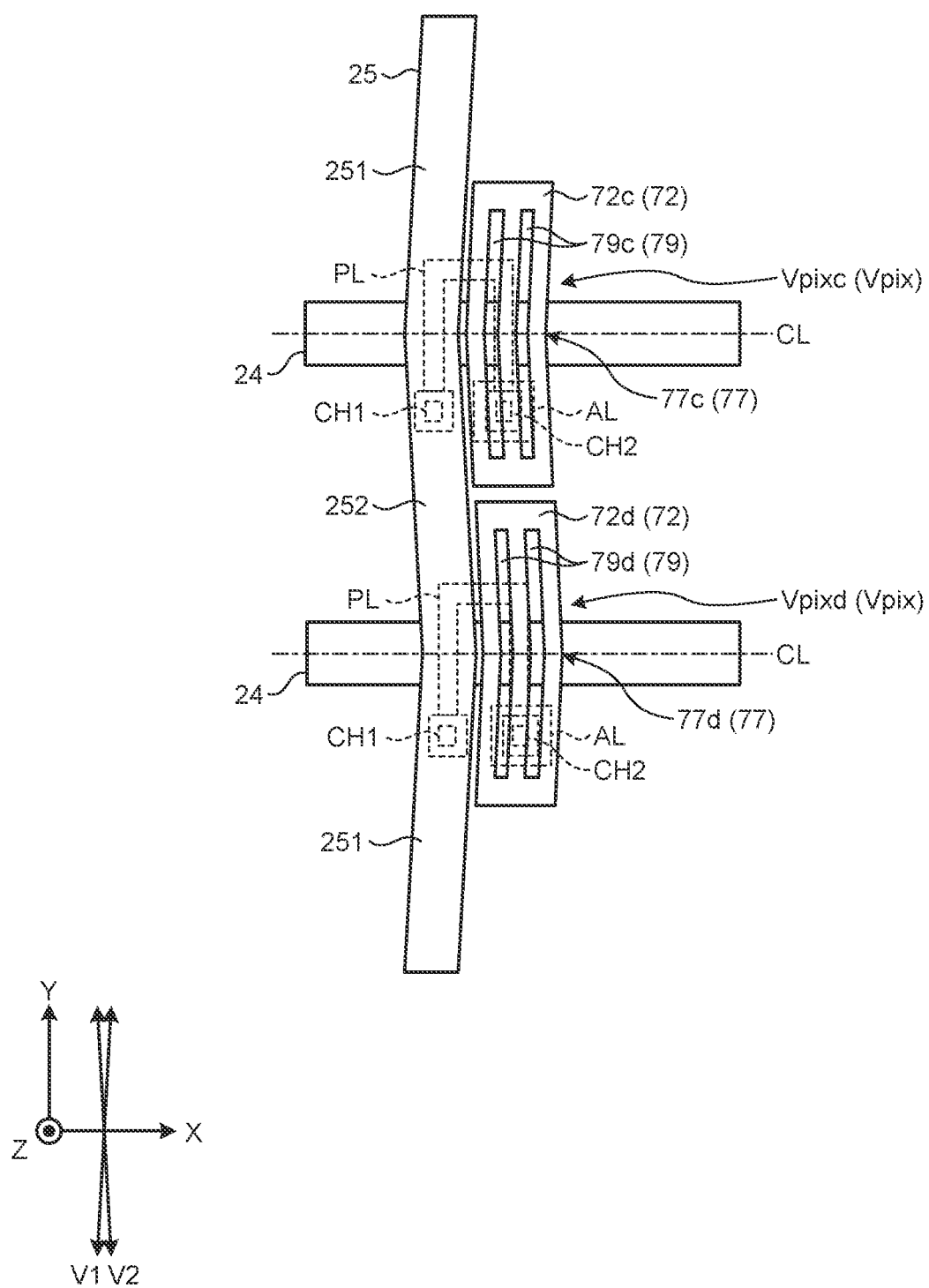
FIG. 8 is a schematic diagram illustrating the relation between the scan lines, the signal lines, and the pixel electrodes that is different from that in FIG. 5.

FIG. 7 and FIG. 8 are schematic diagrams illustrating a relation between the scan lines 24, the signal lines 25, and the pixel electrodes 72 that is different from that in FIG. 5. As illustrated in FIG. 7 and FIG. 8, the pixel electrode 72 and the signal line 25 may be coupled to each other through a semiconductor portion PL made of polysilicon. Contact holes CH1 are formed in coupling portions between the semiconductor portions PL and the signal lines 25. A contact hole CH2 is provided in the coupling portion between the semiconductor portion PL and the pixel electrode 72. As illustrated in FIG. 7 and FIG. 8, an aluminum pedestal AL arranged so as to include the contact hole CH2 on the inner side thereof when seen in X-Y plane view may be provided in order to couple the semiconductor portion PL and the pixel electrode 72. The semiconductor portion PL transmits, to the pixel electrode 72, a signal in accordance with the pixel signal supplied to the signal line 25 in response to the vertical scanning pulse to the scan line 24. FIG. 7 extracts and illustrates one sub-pixel Vpixa and one sub-pixel Vpixb, and FIG. 8 extracts and illustrates one sub-pixel Vpixc and one sub-pixel Vpixd. The arrangement of and a positional relation between the sub-pixels Vpixa, the sub-pixels Vpixb, the sub-pixels Vpixc, and the sub-pixels Vpixd are as described above with reference to FIG. 5.

Each of the bending portions 77 may be arranged so as to overlap with the corresponding scan line 24. In the example illustrated in FIG. 8, the bending portion 77 is located on a center line CL, in the Y direction, of the scan line 24 that is along the X direction. On the other hand, as illustrated in FIG. 7, the pixel electrodes 72 of the sub-pixel Vpixa and the sub-pixel Vpixb are arranged so as to overlap with no scan lines 24 in X-Y plane view. That is to say, the sub-pixels Vpixa and the sub-pixels Vpixb in the first columns CR and the second columns CG are not arranged in the X direction of the bending portions 77.

Next, driving of the sub-pixels Vpix is described. The display device 1 has a possibility that a specific resistance (resistance value unique to a material) of the liquid crystal, and the like are deteriorated due to continuous application of DC voltage having the same polarity to the liquid crystal elements LC. In the display device 1, a driving method of inverting the polarities of the pixel signals at a predetermined cycle based on a drive signal is employed in order to prevent deterioration in the specific resistance (resistance value unique to the material) of the liquid crystal, and the like.

Known examples of the driving method of a liquid crystal display panel like the display device 1 in the embodiment include a column inversion driving method, a line inversion driving method, a dot inversion driving method, and a frame inversion driving method. The column inversion driving method is a driving method in which voltages of opposite polarities are applied to adjacent columns of the sub-pixels or the pixels Pix as combinations of the sub-pixels and the polarities of the applied voltages are inverted at a predetermined cycle. It has been known that the column inversion driving method reduces charge and discharge in the signal lines 25 and power consumption over the dot inversion driving method. Various circuits described in Japanese Examined Patent Application Publication No. 5-43118 can be applied to the display device 1.

Figure 9:
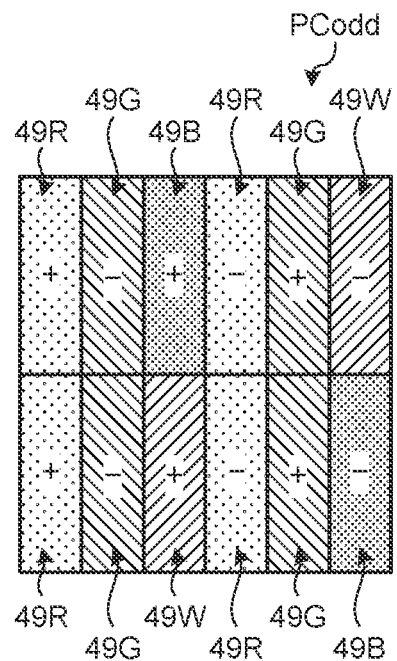
FIG. 9 is a schematic diagram for explaining a display region driven by using a column inversion driving method.
Figure 10:
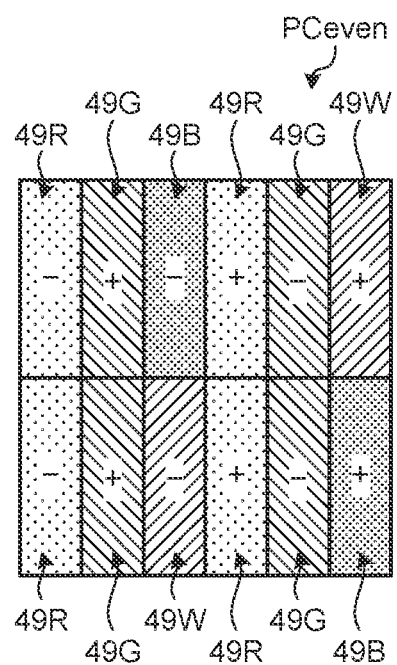
FIG. 10 is a schematic diagram for explaining the display region driven by using the column inversion driving method.
Figure 11:
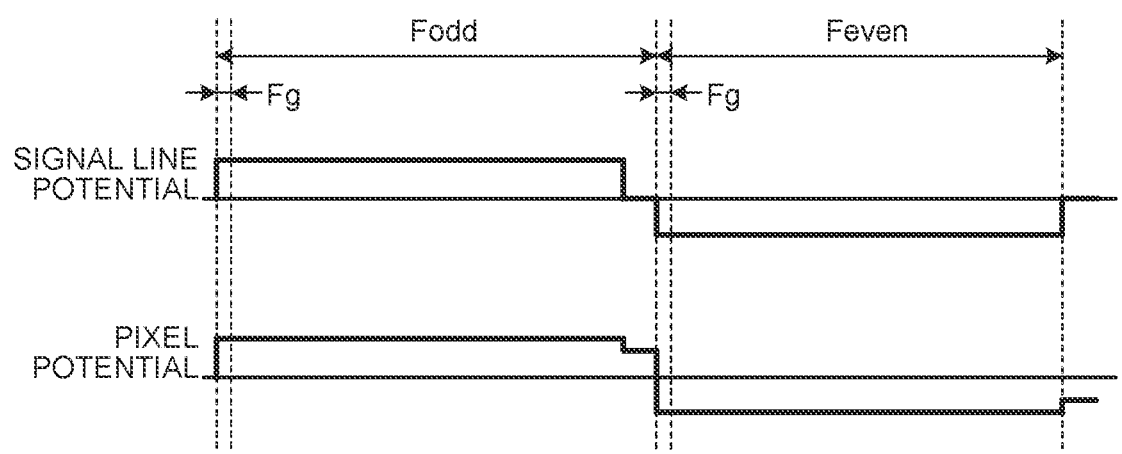
FIG. 11 is a schematic diagram for explaining a relation between a signal line potential and a pixel potential when driving is performed by using the column inversion driving method.

FIG. 9 and FIG. 10 are schematic diagrams for explaining the display region 21 driven by using the column inversion driving method. FIG. 11 is a schematic diagram for explaining a relation between a signal line potential and a pixel potential when driving is performed by using the column inversion driving method. In the following explanation, the sub-pixel Vpix provided with the color filter 66 of red (R) is a first sub-pixel 49R. The sub-pixel Vpix provided with the color filter 66 of green (G) is a second sub-pixel 49G. The sub-pixel Vpix provided with the color filter 66 of blue (B) is a third sub-pixel 49B. The sub-pixel Vpix of white (W) is a fourth sub-pixel 49W. In FIG. 9 and FIG. 10, a positional relation between both the first sub-pixels 49R and the second sub-pixels 49G and the third sub-pixels 49B or the fourth sub-pixels 49W in the pixels Pix as well as the shapes of the sub-pixels Vpix corresponding to the shapes of the pixel electrodes 72 are simplified, and they are schematically illustrated with simple rectangles.

For example, when a potential of the common electrode com is a reference potential, a potential higher than the reference potential (hereinafter, referred to as positive (+) polarity) and a potential lower than the reference potential (hereinafter, referred to as negative (−) polarity) are alternately applied to the sub-pixels Vpix arranged in the row direction that correspond to the first sub-pixel 49R, the second sub-pixel 49G, and the third sub-pixel 49B (fourth sub-pixels 49W) such that the polarities of the potentials applied to the sub-pixels Vpix adjacent in the row direction are made different from each other, and an application state PCodd illustrated in FIG. 9 and an application state PCeven illustrated in FIG. 10 are alternately repeated. Although in the embodiment, the reference potential is the potential of the common electrodes com, the reference potential is not, however, limited to the potential of the common electrodes com, and it is sufficient that the reference potential is a predetermined potential. As described above, in the column inversion driving method, voltages are applied such that the potentials, with respect to the reference potential, of the pixel electrodes 72 of the sub-pixels 49 of the adjacent columns are different from each other, and the polarities of the applied voltages are inverted at the predetermined cycle. The different voltages (for example, having opposite polarities) are applied to the adjacent signal lines 25, and the polarities of the applied voltages are inverted at the predetermined cycle.

As illustrated in FIG. 11, a period Fodd of the application state PCodd illustrated in FIG. 9 and a period Feven of the application state PCeven illustrated in FIG. 10 are alternately provided with writing periods Fg as the boundaries thereof. As illustrated in FIG. 11, a polarity inversion cycle of the potentials of the pixel electrodes 72 and a polarity inversion cycle of the potentials of the signal lines 25 are substantially identical to the period Fodd or the period Feven.

Figure 12:
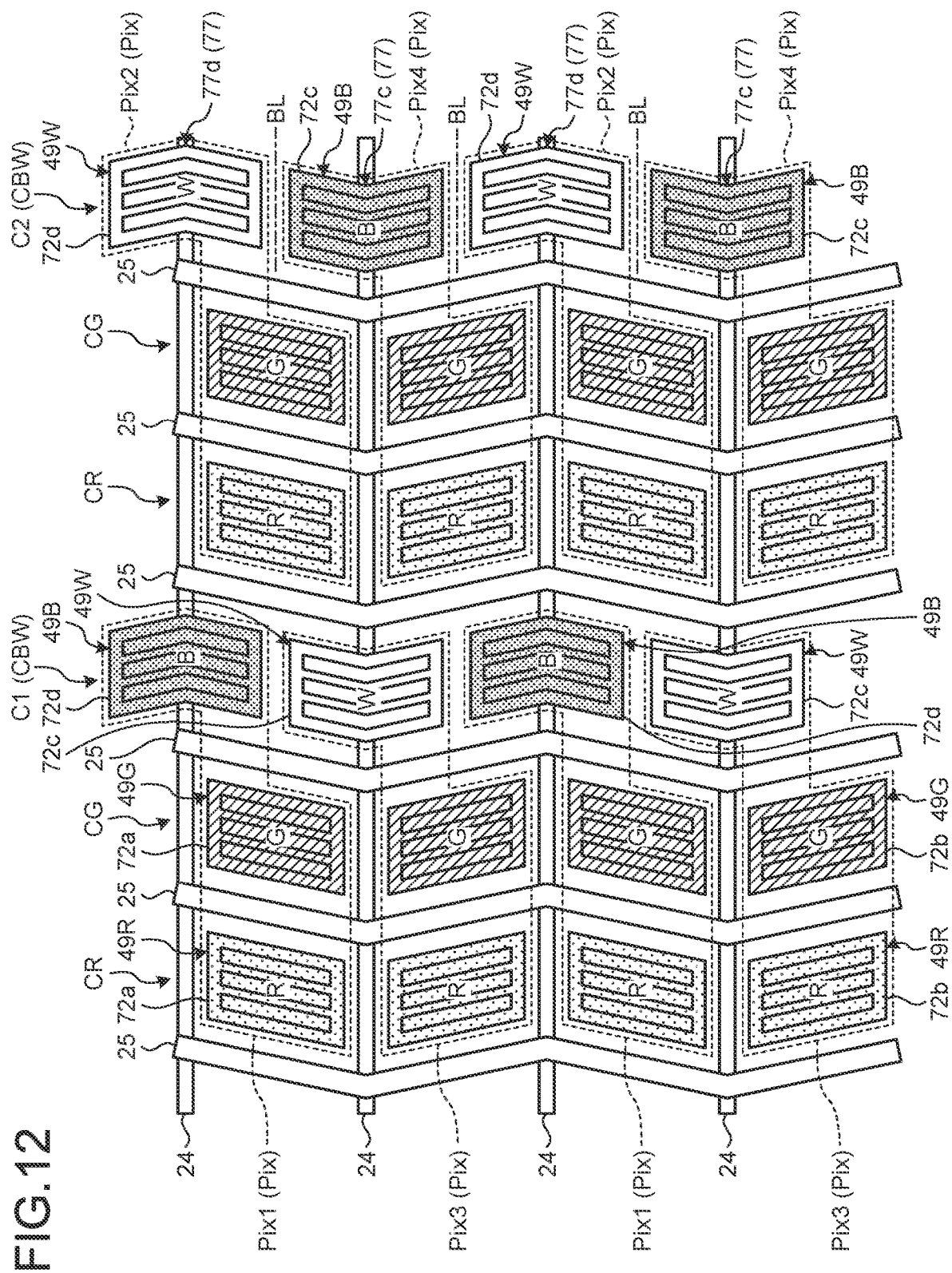
FIG. 12 is a schematic diagram illustrating an example of colors and types of the pixel electrodes that are assigned to respective pixels of X×Y=2×4 (eight pixels) in the embodiment.
Figure 13:
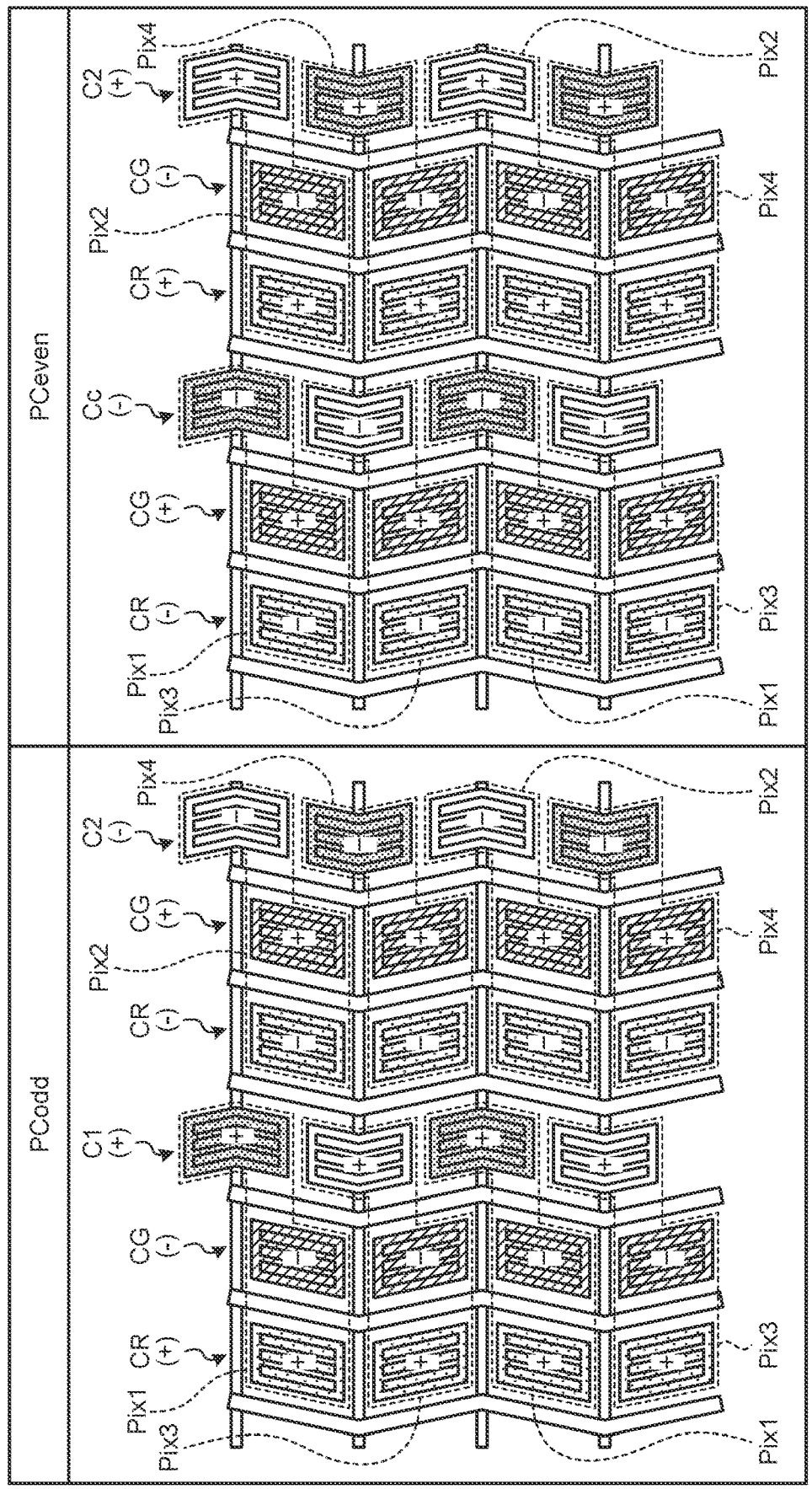
FIG. 13 is a descriptive diagram for explaining polarity distribution when column inversion is applied to the eight pixels illustrated in FIG. 12.

Hereinafter, a relation between the types of the pixel electrodes 72 included in the sub-pixels Vpix and the column inversion will be described with reference to FIG. 12 and FIG. 13. FIG. 12 is a schematic diagram illustrating an example of colors and the types of the pixel electrodes 72 that are assigned to the respective pixels Pix of X×Y=2×4 (eight pixels) in the embodiment. FIG. 13 is a descriptive diagram for explaining polarity distribution when the column inversion is applied to the eight pixels Pix illustrated in FIG. 12.

As illustrated in FIG. 12, the pixels Pix of X×Y=2×2 are different from one another. The pixels Pix of 2×2 include one pixel Pix1, one pixel Pix2, one pixel Pix3, and one pixel Pix4. Each of the pixel Pix1 and the pixel Pix4 is the first pixel including the first sub-pixel 49R, the second sub-pixel 49G, and the third sub-pixel 49B. Each of the pixel Pix2 and the pixel Pix3 is the second pixel including the first sub-pixel 49R, the second sub-pixel 49G, and the fourth sub-pixel 49W. The pixel electrodes 72 of the first sub-pixels 49R and the pixel electrodes 72 of the second sub-pixels 49G included in the pixel Pix1 and the pixel Pix2 are the first pixel electrodes 72a. The pixel electrodes 72 of the first sub-pixels 49R and the pixel electrodes 72 of the second sub-pixels 49G included in the pixel Pix3 and the pixel Pix4 are the second pixel electrodes 72b. The pixel electrode 72 of the third sub-pixel 49B included in the pixel Pix1 and the pixel electrode 72 of the fourth sub-pixel 49W included in the pixel Pix2 are the fourth pixel electrodes 72d. The pixel electrode 72 of the fourth sub-pixel 49W included in the pixel Pix3 and the pixel electrode 72 of the third sub-pixel 49B included in the pixel Pix4 are the third pixel electrodes 72c.

The pixel Pix2 is adjacent to the pixel Pix1 in the X direction. The pixel Pix3 is adjacent to the pixel Pix1 in the Y direction. The pixel Pix4 is adjacent to the pixel Pix3 in the X direction. The pixel Pix4 is adjacent to the pixel Pix2 in the Y direction. In this manner, the first pixels and the second pixels are alternately arranged in the X direction and the Y direction.

In a pixel region including the pixels Pix of X×Y=2×2, four first sub-pixels 49R and four second sub-pixels 49G are provided and two third sub-pixels 49B and two fourth sub-pixels 49W are provided. The number of the first sub-pixels 49R including the pixel electrodes 72 as the first pixel electrodes 72a and the number of the first sub-pixels 49R including the pixel electrodes 72 as the second pixel electrodes 72b are equal to each other. The number of the second sub-pixels 49G including the pixel electrodes 72 as the first pixel electrodes 72a and the number of the second sub-pixels 49G including the pixel electrodes 72 as the second pixel electrodes 72b are equal to each other. The number of the third sub-pixels 49B including the pixel electrodes 72 as the third pixel electrodes 72c and the number of the third sub-pixels 49B including the pixel electrodes 72 as the fourth pixel electrodes 72d are equal to each other. The number of the fourth sub-pixels 49W including the pixel electrodes 72 as the third pixel electrodes 72c and the number of the fourth sub-pixels 49W including the pixel electrodes 72 as the fourth pixel electrodes 72d are equal to each other.

In FIG. 12 and FIG. 13, the third column CBW in which the pixel electrodes 72 of the third sub-pixels 49B are the fourth pixel electrodes 72d and the pixel electrodes 72 of the fourth sub-pixels 49W are the third pixel electrodes 72c, is a column C1. In the column C1, the third sub-pixel 49B (fourth pixel electrode 72d) of the pixel Pix1 and the fourth sub-pixel 49W (third pixel electrode 72c) of the pixel Pix3 are alternately arrayed in the Y direction. The third column CBW in which the pixel electrodes 72 of the third sub-pixels 49B are the third pixel electrodes 72c and the pixel electrodes 72 of the fourth sub-pixels 49W are the fourth pixel electrodes 72d, is a column C2. In the column C2, the fourth sub-pixel 49W (fourth pixel electrode 72d) of the pixel Pix2 and the third sub-pixel 49B (third pixel electrode 72c) of the pixel Pix4 are alternately arrayed in the Y direction.

Although in FIG. 12 and FIG. 13, the two pixel regions each including the pixels Pix of X×Y=2×2 are continuously arranged in the Y direction, actually, such pixel regions are arranged in the display region 21 in a matrix with a row-column configuration.

As illustrated in FIG. 13, with application of the column inversion, voltage is applied such that the potential becomes different between the columns adjacent in the X direction. The pixel region of one pixel Pix includes three columns. Two pixels Pix arranged adjacent to each other in the X direction therefore have such relation that the polarities are inverted on a column by column basis. To be specific, the polarity of the first column CR in the pixel Pix1 and the polarity of the first column CR in the pixel Pix2 are different from each other. The polarity of the second column CG in the pixel Pix1 and the polarity of the second column CG in the pixel Pix2 are different from each other. The polarity of the column C1 in the pixel Pix1 and the polarity of the column C2 in the pixel Pix2 are different from each other. A relation between the polarities of the pixel Pix3 and the polarities of the pixel Pix4 is also similar to the relation between the polarities of the pixel Pix1 and the polarities of the pixel Pix2. With the column inversion, the polarities of the columns are the same between the pixels Pix arrayed in the Y direction. That is to say, the polarities of the columns are the same between the pixel Pix1 and the pixel Pix3. The polarities of the columns are the same between the pixel Pix2 and the pixel Pix4.

In the application state PCodd, the polarity of the first column CR in which the pixel Pix1 and the pixel Pix3 are arranged is positive, and the polarity of the first column CR in which the pixel Pix2 and the pixel Pix4 are arranged is negative. In this manner, the first sub-pixel 49R (pixel Pix1) including the first pixel electrode 72a and having the positive polarity, the first sub-pixel 49R (pixel Pix2) including the first pixel electrode 72a and having the negative polarity, the first sub-pixel 49R (pixel Pix3) including the second pixel electrode 72b and having the positive polarity, and the first sub-pixel 49R (pixel Pix4) including the second pixel electrode 72b and having the negative polarity are provided one for each in the pixel region including the pixels Pix of X×Y=2×2.

When deviation in the orientations of the liquid crystal molecules that are defined by the polarities and the directions of the main portions of the branch electrodes 76 and the openings 79 of the pixel electrodes 72 is generated, a flicker due to generation of difference in the luminance between before and after switching of the inversion driving can be visually recognized. To cope with this, in the embodiment, the first sub-pixel 49R (pixel Pix1) including the first pixel electrode 72a and having the positive polarity, the first sub-pixel 49R (pixel Pix2) including the first pixel electrode 72a and having the negative polarity, the first sub-pixel 49R (pixel Pix3) including the second pixel electrode 72b and having the positive polarity, and the first sub-pixel 49R (pixel Pix4) including the second pixel electrode 72b and having the negative polarity are provided one for each in the pixel region including the pixels Pix of X×Y=2×2. Consequently, deviation to a combination of a specific polarity and a direction of the main portion of specific branch electrode 76 and specific opening 79 is not generated for red (R). This can provide a mechanism for preventing a flicker in units of the pixel region of X×Y=2×2, from the viewpoint of the correspondence relation between the polarity and the direction of the main portions of the branch electrodes 76 and the openings 79.

In the application state PCodd, the polarity of the second column CG in which the pixel Pix1 and the pixel Pix3 are arranged is negative, and the polarity of the second column CG in which the pixel Pix2 and the pixel Pix4 are arranged is positive. In this manner, the second sub-pixel 49G (pixel Pix2) including the first pixel electrode 72a and having the positive polarity, the second sub-pixel 49G (pixel Pix1) including the first pixel electrode 72a and having the negative polarity, the second sub-pixel 49G (pixel Pix4) including the second pixel electrode 72b and having the positive polarity, and the second sub-pixel 49G (pixel Pix3) including the second pixel electrode 72b and having the negative polarity are provided one for each in the pixel region including the pixels Pix of X×Y=2×2. This can provide the mechanism for preventing a flicker in units of the pixel region of X×Y=2×2 also for green (G) as in the case of red (R).

In the application state PCodd, the polarity of the column C1 in which the pixel Pix1 and the pixel Pix3 are arranged is positive, and the polarity of the column C2 in which the pixel Pix2 and the pixel Pix4 are arranged is negative. Consequently, the polarity of the third sub-pixel 49B included in the pixel Pix1 is positive, and the polarity of the third sub-pixel 49B included in the pixel Pix4 is negative. The fourth pixel electrode 72d of the third sub-pixel 49B included in the pixel Pix1 has the fourth extension electrode 762d along the first extension direction V1 and the third extension electrode 761d along the second extension direction V2 (see FIG. 5). That is to say, the fourth pixel electrode 72d of the third sub-pixel 49B included in the pixel Pix1 has a positive polarity portion along the first extension direction V1 and a positive polarity portion along the second extension direction V2. The third pixel electrode 72c of the third sub-pixel 49B included in the pixel Pix4 has the first extension electrode 761c along the first extension direction V1 and the second extension electrode 762c along the second extension direction V2 (see FIG. 5). That is to say, the third pixel electrode 72c of the third sub-pixel 49B included in the pixel Pix4 has a negative polarity portion along the first extension direction V1 and a negative polarity portion along the second extension direction V2. In this manner, for blue (B), the positive polarity portion along the first extension direction V1, the positive polarity portion along the second extension direction V2, the negative polarity portion along the first extension direction V1, and the negative polarity portion along the second extension direction V2 are provided in the pixel region including the pixels Pix of X×Y=2×2. This can provide the mechanism for preventing a flicker in units of the pixel region of X×Y=2×2 also for blue (B) as in the cases of red (R) and green (G).

In the application state PCodd, the polarity of the fourth sub-pixel 49W included in the pixel Pix2 is negative, and the polarity of the fourth sub-pixel 49W included in the pixel Pix3 is positive. The fourth pixel electrode 72d of the fourth sub-pixel 49W included in the pixel Pix2 has the fourth extension electrode 762d along the first extension direction V1 and the third extension electrode 761d along the second extension direction V2 (see FIG. 5). That is to say, the fourth pixel electrode 72d of the fourth sub-pixel 49W included in the pixel Pix2 has a negative polarity portion along the first extension direction V1 and a negative polarity portion along the second extension direction V2. The third pixel electrode 72c of the fourth sub-pixel 49W included in the third pixel Pix3 has the first extension electrode 761c along the first extension direction V1 and the second extension electrode 762c along the second extension direction V2 (see FIG. 5). That is to say, the third pixel electrode 72c of the fourth sub-pixel 49W included in the pixel Pix3 has a positive polarity portion along the first extension direction V1 and a positive polarity portion along the second extension direction V2. In this manner, for white (W), the positive polarity portion along the first extension direction V1, the positive polarity portion along the second extension direction V2, the negative polarity portion along the first extension direction V1, and the negative polarity portion along the second extension direction V2 are provided in the pixel region including the pixels Pix of X×Y=2×2. This can provide the mechanism for preventing a flicker in units of the pixel region of X×Y=2×2 also for white (W) as in the cases of red (R), green (G) and blue (B).

The polarities in the application state PCeven are opposite to those in the application state PCodd. That is to say, even in the application state PCeven, deviation to the combination of a specific polarity and a direction of the main portion of specific branch electrode 76 and specific opening 79 is not generated as in the application state PCodd because only the polarities in the application state PCeven are opposite to those in the application state PCodd.

As described above with reference to FIG. 7 and FIG. 8, the bending portions 77 illustrated in FIG. 12 are arranged so as to overlap with the scan lines 24. On the other hand, the pixel electrodes 72 in the first columns CR and the second columns CG are arranged so as to overlap with no scan lines 24 in X-Y plane view. In this manner, the first sub-pixels 49R and the second sub-pixels 49G are not arranged in the X direction of the bending portions 77. As illustrated in FIG. 12, a boundary line BL between the third sub-pixel 49B and the fourth sub-pixel 49W are present between the two scan lines 24 adjacent in the Y direction.

Figure 14:
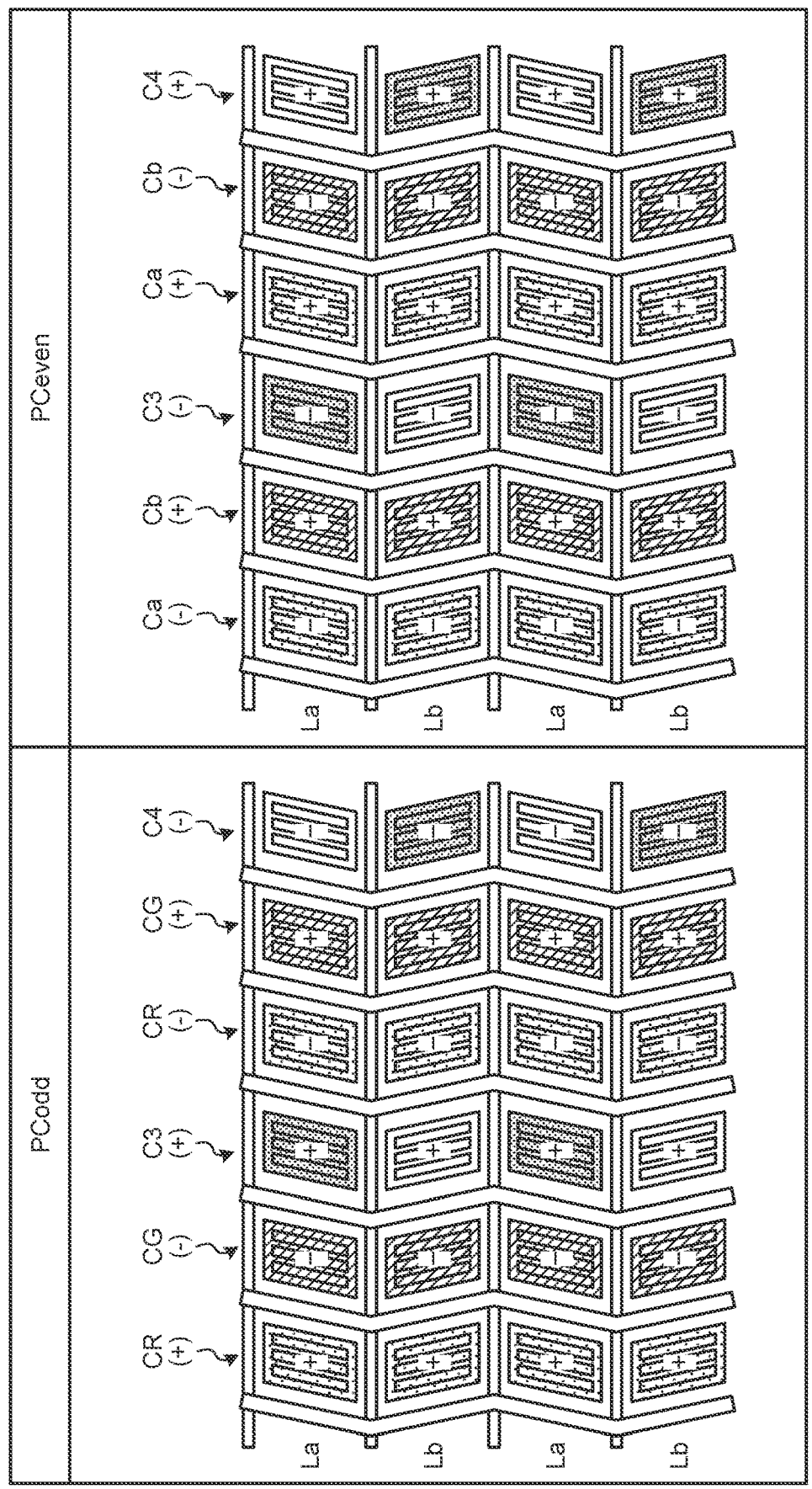
FIG. 14 is a descriptive diagram for explaining polarity distribution when the column inversion is applied to a pixel region of X×Y=4×2 in a comparative example.

FIG. 14 is a descriptive diagram for explaining polarity distribution when the column inversion is applied to a pixel region of X×y=4×2 in a comparative example. In the comparative example, a column C3 and a column C4 are provided instead of the column C1 and the column C2 in the embodiment. As in the first column CR and the second column CG, the first pixel electrodes 72a and the second pixel electrodes 72b are alternately arrayed in the Y direction in the column C3 and the column C4. As illustrated in FIG. 14, for blue (B) in the application state PCodd, only the positive polarity portion along the first extension direction V1 and the negative polarity portion along the second extension direction V2 are generated whereas the positive polarity portion along the second extension direction V2 and the negative polarity portion along the first extension direction V1 are not generated. For white (W), only the negative polarity portion along the first extension direction V1 and the positive polarity portion along the second extension direction V2 are generated whereas the positive polarity portion along the first extension direction V1 and the negative polarity portion along the second extension direction V2 are not generated. In this manner, in the comparative example, deviation to the combination of a specific polarity and a direction of the main portion of specific branch electrode 76 and specific opening 79 is generated. The polarities in the application state PCeven becomes opposite to those in the application state PCodd, and deviation to the combination of a specific polarity and a direction of the main portion of specific branch electrode 76 and specific opening 79 is generated also in the application state PCeven.

Figure 15:
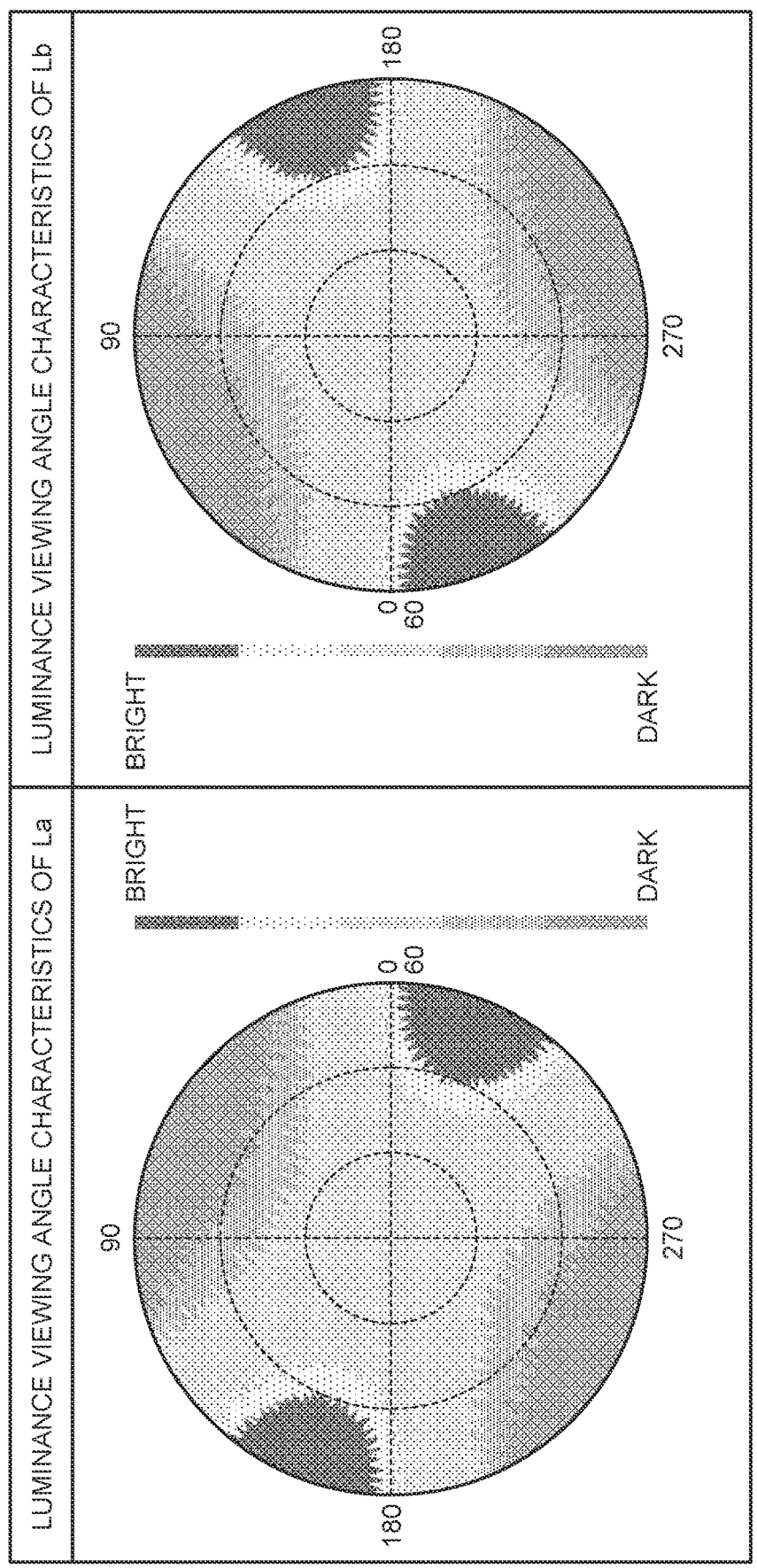
FIG. 15 is a luminance viewing angle characteristic diagram in the comparative example.

FIG. 15 is a luminance viewing angle characteristic diagram in the comparative example. FIG. 15 individually illustrates the luminance viewing angle characteristics of pixel rows La and the luminance viewing angle characteristics of pixel rows Lb in FIG. 14. As described above with reference to FIG. 14, when the deviation to the combination of a specific polarity and a direction of the main portion of specific branch electrode 76 and specific opening 79 is generated for blue (B) and white (W), a flicker can be visually recognized depending on viewing angles due to deviation in the luminance distribution corresponding to the luminance viewing angle characteristics as illustrated in FIG. 15. In particular, a flicker is recognized more significantly as driving is performed at a lower frequency.

On the other hand, according to the embodiment, no deviation to the combination of a specific polarity and a direction of the main portion of specific branch electrode 76 and specific opening 79 is generated. A flicker can therefore be prevented more reliably even at a frequency at which a flicker is recognized in the comparative example.

The column inversion can prevent deterioration in the specific resistance (resistance value unique to the material) of the liquid crystal, and the like. That is to say, the embodiment can achieve both of prevention of the deterioration in the specific resistance (resistance value unique to the material) of the liquid crystal and the like and prevention of a flicker.

By overlapping the bending portion 77 with the scan line 24, the extension lengths of the first extension electrode 761c and the second extension electrode 762c with the bending portion 77c interposed therebetween are made easy to be equivalent to or approximately equivalent to each other. This can be applied to a relation between the extension length of the third extension electrode 761d and the extension length of the fourth extension electrode 762d with the bending portion 77d interposed therebetween. Thus, a flicker due to the deviation to a direction of the main portion of specific branch electrode 76 and specific opening 79 can be prevented more reliably.

The first portions 251 and the second portions 252 are made parallel with the main portions of the branch electrodes 76, thereby arranging the signal lines 25 and the pixel electrodes 72 more densely.

The first extension electrode 761c and the second extension electrode 762c are provided with the bending portion 77c interposed therebetween, and the fourth extension electrode 762d and the third extension electrode 761d are provided with the bending portion 77d interposed therebetween. The extension direction of the first extension electrode 761c and the extension direction of the fourth extension electrode 762d are along the first extension direction V1, and the extension direction of the second extension electrode 762c and the extension direction of the third extension electrode 761d are along the second extension direction V2. This configuration makes it possible to arrange the first pixel electrodes 72a, the second pixel electrodes 72b, the third pixel electrode 72c, and the fourth pixel electrodes 72d more densely.

In the first pixel and the second pixel adjacent in the Y direction, the angle of the bending portion 77 included in the pixel electrode 72 of the third sub-pixel 49B in the first pixel is opposite in direction to the angle of the bending portion 77 included in the pixel electrode 72 of the fourth sub-pixel 49W in the second pixel, whereby the first pixel electrodes 72a, the second pixel electrodes 72b, the third pixel electrodes 72c, and the fourth pixel electrodes 72d can be arranged more densely.

Modifications

Hereinafter, modifications of the embodiment will be described with reference to FIG. 16 to FIG. 18.

First Modification

Figure 16:
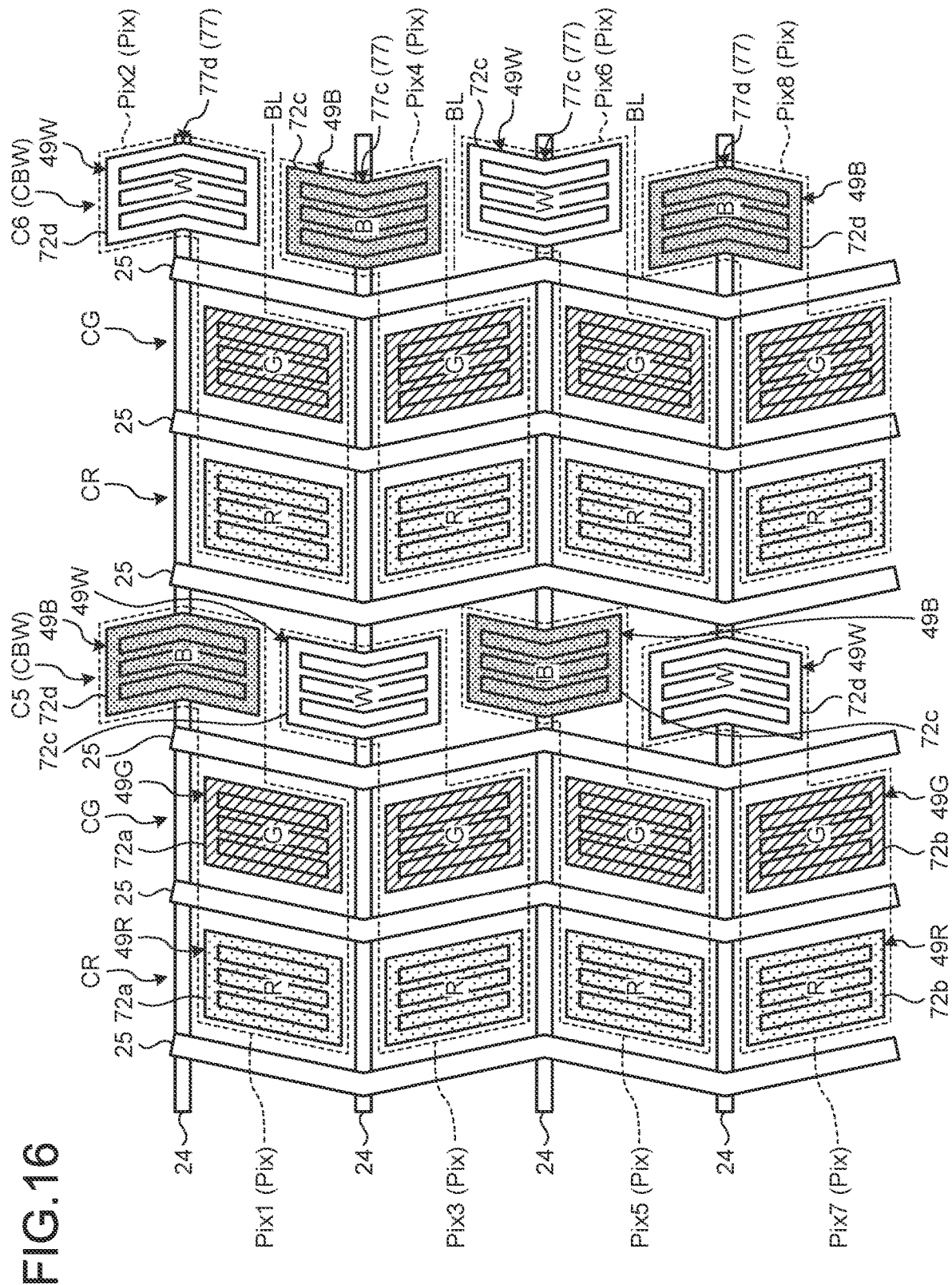
FIG. 16 is a schematic diagram illustrating an example of colors and types of pixel electrodes that are assigned to respective pixels of X×Y=2×4 (eight pixels) in a first modification.

FIG. 16 is a schematic diagram illustrating an example of colors and types of the pixel electrodes 72 that are assigned to respective pixels Pix of X×Y=2×4 (eight pixels) in a first modification. The pixels Pix in the first modification further include a pixel Pix5, a pixel Pix6, a pixel Pix7, and a pixel Pix8 in addition to the pixel Pix1, the pixel Pix2, the pixel Pix3, and the pixel Pix4 in the embodiment.

Each of the pixel Pix5 and the pixel Pix8 is the first pixel including the first sub-pixel 49R, the second sub-pixel 49G, and the third sub-pixel 49B. Each of the pixel Pix6 and the pixel Pix7 is the second pixel including the first sub-pixel 49R, the second sub-pixel 49G, and the fourth sub-pixel 49W. The pixel electrodes 72 of the first sub-pixels 49R and the pixel electrodes 72 of the second sub-pixels 49G included in the pixel Pix5 and the pixel Pix6 are the first pixel electrodes 72a. The pixel electrodes 72 of the first sub-pixels 49R and the pixel electrodes 72 of the second sub-pixels 49G included in the pixel Pix7 and the pixel Pix8 are the second pixel electrodes 72b. The pixel electrode 72 of the third sub-pixel 49B included in the pixel Pix5 and the pixel electrode 72 of the fourth sub-pixel 49W included in the pixel Pix6 are the third pixel electrodes 72c. The pixel electrode 72 of the fourth sub-pixel 49W included in the pixel Pix7 and the pixel electrode 72 of the third sub-pixel 49B included in the pixel Pix8 are the fourth pixel electrodes 72d.

The pixel Pix6 is adjacent to the pixel Pix5 in the X direction in the pixel region including the pixels Pix of X×Y=2×2. The pixel Pix7 is adjacent to the pixel Pix5 in the Y direction. The pixel Pix8 is adjacent to the pixel Pix7 in the X direction. The pixel Pix8 is adjacent to the pixel Pix6 in the Y direction.

A pixel region including the pixel Pix1, the pixel Pix2, the pixel Pix3, and the pixel Pix4 in the pixel region including the pixels Pix of X×Y=2×2 and a pixel region including the pixel Pix5, the pixel Pix6, the pixel Pix7, and the pixel Pix8 in the pixel region including the pixels Pix of X×Y=2×2 are alternately arranged in the Y direction.

In the first modification, a column C5 and a column C6 are provided instead of the column C1 and the column C2 in the embodiment. In the column C5, the third sub-pixel 49B (fourth pixel electrode 72d) of the pixel Pix1, the fourth sub-pixel 49W (third pixel electrode 72c) of the pixel Pix3, the third sub-pixel 49B (third pixel electrode 72c) of the pixel Pix5, and the fourth sub-pixel 49W (fourth pixel electrode 72d) of the pixel Pix7 are periodically arrayed in the Y direction. In the column C6, the fourth sub-pixel 49W (fourth pixel electrode 72d) of the pixel Pix2, the third sub-pixel 49B (third pixel electrode 72c) of the pixel Pix4, the fourth sub-pixel 49W (third pixel electrode 72c) of the pixel Pix6, and the third sub-pixel 49B (fourth pixel electrode 72d) of the pixel Pix8 are periodically arrayed in the Y direction. As described above, in the first modification, two of the fourth sub-pixels 49W arranged in the Y direction with one of the third sub-pixels 49B interposed therebetween respectively have the bending portions 77 the angles of which are opposite in direction to each other. Two of the third sub-pixels 49B arranged in the Y direction with one of the fourth sub-pixels 49W interposed therebetween respectively have the bending portions 77 the angles of which are opposite in direction to each other. As illustrated in FIG. 16, in the pixel region including the pixel Pix5, the pixel Pix6, the pixel Pix7, and the pixel Pix8, the signal lines 25 are not along the main portions of the branch electrodes 76 included in the third pixel electrodes 72c and the fourth pixel electrodes 72d.

Figure 17:
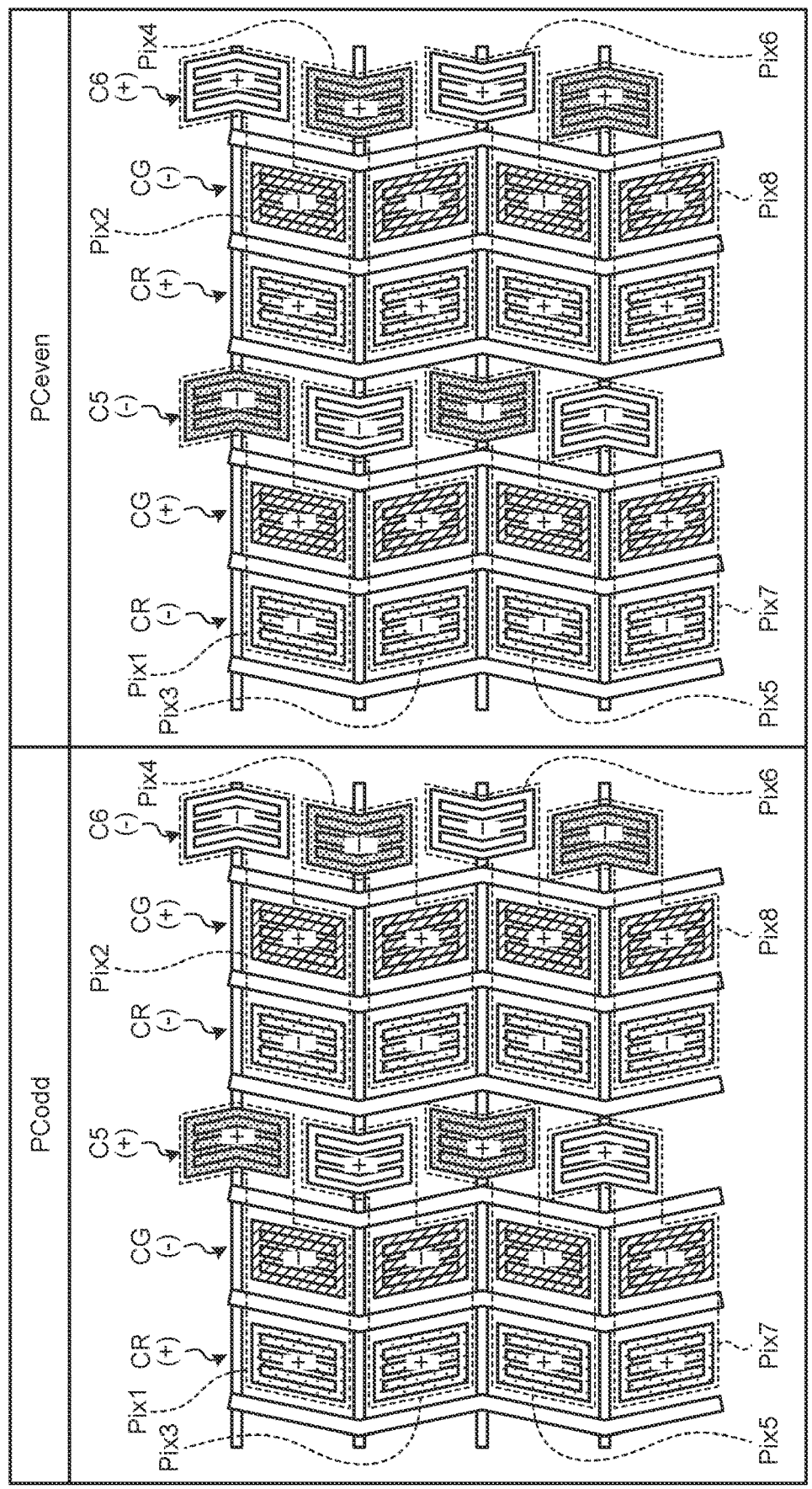
FIG. 17 is a descriptive diagram for explaining polarity distribution when the column inversion is applied to the eight pixels illustrated in FIG. 16.

FIG. 17 is a descriptive diagram for explaining polarity distribution when the column inversion is applied to the eight pixels Pix illustrated in FIG. 16. In the application state PCodd, the polarity of the column C5 in which the pixel Pix5 and the pixel Pix7 are arranged is positive, and the polarity of the column C6 in which the pixel Pix6 and the pixel Pix8 are arranged is negative. Consequently, the polarity of the third sub-pixel 49B included in the pixel Pix5 is positive, and the polarity of the third sub-pixel 49B included in the pixel Pix8 is negative. The third pixel electrode 72c of the third sub-pixel 49B included in the pixel Pix5 has the first extension electrode 761c along the first extension direction V1 and the second extension electrode 762c along the second extension direction V2 (see FIG. 5). That is to say, the third pixel electrode 72c of the third sub-pixel 49B included in the pixel Pix5 has a positive polarity portion along the first extension direction V1 and a positive polarity portion along the second extension direction V2. The fourth pixel electrode 72d of the third sub-pixel 49B included in the pixel Pix8 has the fourth extension electrode 762d along the first extension direction V1 and the third extension electrode 761d along the second extension direction V2 (see FIG. 5). That is to say, the fourth pixel electrode 72d of the third sub-pixel 49B included in the pixel Pix8 has a negative polarity portion along the first extension direction V1 and a negative polarity portion along the second extension direction V2. In this manner, for blue (B), the positive polarity portion along the first extension direction V1, the positive polarity portion along the second extension direction V2, the negative polarity portion along the first extension direction V1, and the negative polarity portion along the second extension direction V2 are provided in the pixel region including the pixels Pix of X×Y=2×2.

In the application state PCodd, the polarity of the fourth sub-pixel 49W included in the pixel Pix6 is negative, and the polarity of the fourth sub-pixel 49W included in the pixel Pix7 is positive. The third pixel electrode 72c of the fourth sub-pixel 49W included in the pixel Pix6 has the first extension electrode 761c along the first extension direction V1 and the second extension electrode 762c along the second extension direction V2 (see FIG. 5). That is to say, the third pixel electrode 72c of the fourth sub-pixel 49W included in the pixel Pix6 has a negative polarity portion along the first extension direction V1 and a negative polarity portion along the second extension direction V2. The fourth pixel electrode 72d of the fourth sub-pixel 49W included in the pixel Pix7 has the fourth extension electrode 762d along the first extension direction V1 and the third extension electrode 761d along the second extension direction V2 (see FIG. 5). That is to say, the fourth pixel electrode 72d of the fourth sub-pixel 49W included in the pixel Pix7 has a positive polarity portion along the first extension direction V1 and a positive polarity portion along the second extension direction V2. In this manner, for white (W), the positive polarity portion along the first extension direction V1, the positive polarity portion along the second extension direction V2, the negative polarity portion along the first extension direction V1, and the negative polarity portion along the second extension direction V2 are provided in the pixel region including the pixels Pix of X×Y=2×2.

Thus, also in the pixel region including the pixel Pix5, the pixel Pix6, the pixel Pix7, and the pixel Pix8, the mechanism for preventing a flicker in units of the pixel region of X×Y=2×2 can be provided as in the pixel region including the pixel Pix1, the pixel Pix2, the pixel Pix3, and the pixel Pix4. In addition, in each column, the third sub-pixels 49B can include the bending portions 77 having angles that face in different directions, and the fourth sub-pixels 49W can include the bending portions 77 having angles that face in different directions. Consequently, deviation in the pattern of the third sub-pixels 49B and the fourth sub-pixels 49W can be prevented in units of the column.

Second Modification

Figure 18:
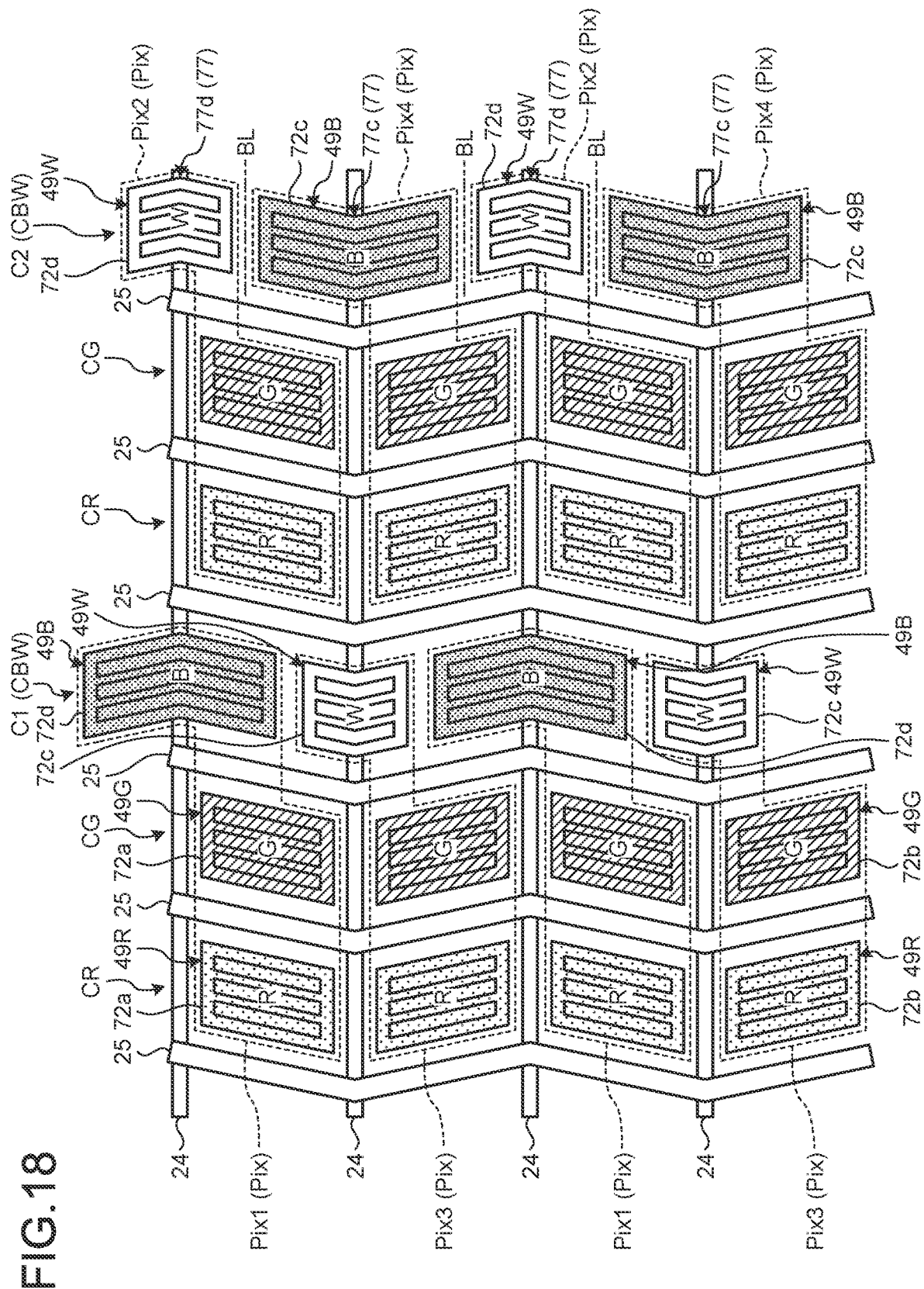
FIG. 18 is a schematic diagram illustrating an example of colors and types of pixel electrodes that are assigned to respective pixels of X×Y=2×4 (eight pixels) in a second modification.

FIG. 18 is a schematic diagram illustrating an example of colors and types of the pixel electrodes 72 that are assigned to respective pixels Pix of X×Y=2×4 (eight pixels) in a second modification. In the second modification, the size of the third sub-pixel 49B in X-Y plane view is increased and the size of the fourth sub-pixel 49W in X-Y plane view is decreased in comparison with those in the embodiment. In the second modification, the size of one third sub-pixel 49B is larger than the size of one first sub-pixel 49R and one second sub-pixel 49G. The size of one fourth sub-pixel 49W is smaller than the size of one first sub-pixel 49R and one second sub-pixel 49G.

In the embodiment, regardless of the third sub-pixels 49B and the fourth sub-pixels 49W, the third pixel electrodes 72c and the fourth pixel electrodes 72d are equal in shape and size in X-Y plane view to one another. By contrast, in the second modification, the third pixel electrodes 72c and the fourth pixel electrodes 72d at positions overlapping with the color filters 66 of blue (B) in X-Y plane view are greater in width in the Y direction than the third pixel electrodes 72c and the fourth pixel electrodes 72d at positions overlapping with the color filters 66 (or positions at which no color filter 66 is provided) of white (W) in X-Y plane view. The color filters 66 provided for the third sub-pixels 49B are greater in width in the Y direction than that for white (W) as in the cases of the third pixel electrodes 72c and the fourth pixel electrodes 72d.

When an area ratio between the third sub-pixel 49B and the fourth sub-pixel 49W in the second modification is represented by B:W, it can be arbitrarily set in a range of 1:1 to 5:1 and desirably in a range of 1:1 to 3:1.

According to the second modification, the luminance of blue (B) can be increased more surely by increasing the size of the third sub-pixels 49B.

The signal lines 25 are not limited to include the first portions 251 and the second portions 252. The signal lines 25 may be along the Y direction.

Other action effects provided by the aspect described in the embodiment or the modifications that are obvious from description of the present specification or at which those skilled in the art can appropriately arrive should be interpreted to be provided by the present invention.

What is claimed is:

1. A display device comprising:
a first pixel including a sub-pixel of a first color, a sub-pixel of a second color, and a sub-pixel of a third color;
a second pixel including a sub-pixel of the first color, a sub-pixel of the second color, and a sub-pixel of a fourth color, and
a plurality of scan lines extending along a row direction and arrayed in a column direction,
wherein
the first pixel and the second pixel are arranged side-by-side in either the row direction or the column direction,
the sub-pixel of the third color and the sub-pixel of the fourth color are arranged side-by-side in the column direction,
each of the sub-pixels includes a pixel electrode including a branch electrode extending in a predetermined direction,
the branch electrode included in one of two sub-pixels of the first color that are adjacent to each other in the column direction has a main portion extending in a first extension direction, and the branch electrode included in the other of the two sub-pixels of the first color has a main portion extending in a second extension direction different from the first extension direction,
the branch electrode included in one of two sub-pixels of the second color that are adjacent to each other in the column direction has a main portion extending in the first extension direction, and the branch electrode included in the other of the two sub-pixels of the second color has a main portion extending in the second extension direction,
the first extension direction and the second extension direction are different from the row direction and the column direction,
each of the branch electrode included in the sub-pixel of the third color and the branch electrode included in the sub-pixel of the fourth color includes a bending portion,
each of the branch electrode included in the sub-pixel of the first color and the branch electrode included in the sub-pixel of the second color is straight without a bending portion, and
in the column direction, only a single sub-pixel of the first color or the second color is disposed between the scan lines adjacent to each other in the column direction, and
wherein
each of the pixel electrode of the sub-pixels has a slit having a first end and a second end in the column direction,
one of the bending portions of the sub-pixels of the third color is disposed in the column direction:
between the first end of the slit in one of two sub-pixels of the first color and the second end of the slit in the other of the two sub-pixels of the first color, the two sub-pixels of the first color being directly adjacent in the column direction; and
between the first end of the slit in one of two sub-pixels of the second color and the second end of the slit in the other of the two sub-pixels of the second color, the two sub-pixels of the second color being directly adjacent in the column direction, and
one of the bending portions of the sub-pixels of the fourth color is disposed in the column direction:
between the first end of the slit in one of two sub-pixels of the first color and the second end of the slit in the other of the two sub-pixels of the first color, the two sub-pixels of the first color being directly adjacent in the column direction; and
between the first end of the slit in one of two sub-pixels of the second color and the second end of the slit in the other of the two sub-pixels of the second color, the two sub-pixels of the second color being directly adjacent in the column direction.

2. The display device according to claim 1, wherein
each of the sub-pixels includes a plurality of the branch electrodes, end portions of which are coupled by coupling portions, and
the slit is provided between the branch electrodes.

3. The display device according to claim 1, wherein
a boundary line between the sub-pixel of the third color and the sub-pixel of the fourth color, which are arranged side-by-side in the column direction, is located between the scan lines adjacent in the column direction.

4. The display device according to claim 1, wherein the display device is driven by a column inversion driving method in which polarities of voltages that are applied to the sub-pixels adjacent in the row direction are different from each other and the polarities of the applied voltages are inverted at a predetermined cycle.

5. The display device according to claim 1, wherein the sub-pixel of the first color and the sub-pixel of the second color are not located in the row direction of the bending portion.

6. The display device according to claim 5, wherein
the bending portion overlaps with one of the scan lines in a plan view.

7. The display device according to claim 1, comprising a plurality of signal lines arranged between the sub-pixels arrayed in the row direction, wherein
the signal lines are provided along the main portions of the branch electrodes.

8. The display device according to claim 1, wherein
each of the branch electrode of the sub-pixel of the third color and the branch electrode of the sub-pixel of the fourth color, which are adjacent to each other in the column direction, includes two portions with the bending portion interposed therebetween,
the two portions of each branch electrode are along different directions, one portion of the two portions is along one of the first extension direction and the second extension direction, and
the other portion thereof is along the other of the first extension direction and the second extension direction.

9. The display device according to claim 1, wherein an angle of the bending portion of the branch electrode in the sub-pixel of the third color is opposite in direction to an angle of the bending portion of the branch electrode in the sub-pixel of the fourth color adjacent to the sub-pixel of the third color in the column direction.

10. The display device according to claim 1, wherein two sub-pixels of the third color arranged in the column direction with the sub-pixel of the fourth color interposed therebetween respectively have the bending portions angles of which are opposite in direction to each other.

11. The display device according to claim 1, wherein two sub-pixels of the fourth color arrayed in the column direction with the sub-pixel of the third color interposed therebetween respectively have the bending portions angles of which are opposite in direction to each other.

* * * * *